(«12») United States Patent
Doane et al.

(10) Patent No.: US 9,869,999 B2
(45) Date of Patent: Jan. 16, 2018

(54) ROBOTIC GOLF CADDY

(71) Applicant: Lemmings LLC, Marietta, SC (US)

(72) Inventors: Dennis W. Doane, Marietta, SC (US);
Rick M. Doane, Marietta, SC (US);
Timothy L. Doane, Marietta, SC (US);
Shea P. Doane, Fort Mill, SC (US);
Robert T. Nicola, Marietta, SC (US);
Kenneth M. Burns, Akron, OH (US)

(73) Assignee: Lemmings, LLC, Marietta, SC (US)

( * ) Notice: Subject to any disclaimer, the term of this patent is extended or adjusted under 35 U.S.C. 154(b) by 0 days.

(21) Appl. No.: 15/293,660

(22) Filed: Oct. 14, 2016

(65) Prior Publication Data

US 2017/0108860 A1    Apr. 20, 2017

Related U.S. Application Data

(60) Provisional application No. 62/242,349, filed on Oct. 16, 2015.

(51) Int. Cl.
| | | |
|---|---|---|
| *G05D 1/00* | (2006.01) | |
| *G05D 1/02* | (2006.01) | |
| *G08G 1/16* | (2006.01) | |
| *G01C 21/20* | (2006.01) | |
| *A63B 55/60* | (2015.01) | |

(52) U.S. Cl.
CPC .......... *G05D 1/0044* (2013.01); *A63B 55/61* (2015.10); *G01C 21/20* (2013.01); *G05D 1/0016* (2013.01); *G05D 1/0088* (2013.01); *G05D 1/0238* (2013.01); *G05D 1/0255* (2013.01); *G05D 1/0278* (2013.01); *G08G 1/16* (2013.01); *G05D 2201/0204* (2013.01)

(58) Field of Classification Search
CPC .... G05D 1/004; G05D 1/0088; G05D 1/0255; G05D 1/0278; G05D 1/0016; G05D 1/0238; G05D 2201/0204; A63B 55/61; G08G 1/16; G01C 21/20
See application file for complete search history.

(56) References Cited

U.S. PATENT DOCUMENTS

| | | |
|---|---|---|
| D183,852 S | 11/1958 | Marcus |
| 3,041,085 A | 6/1962 | White |
| 3,199,621 A | 8/1965 | Seaman |
| 3,247,923 A | 4/1966 | Cornell |
| 3,434,558 A | 3/1969 | Allen |
| D219,509 S | 12/1970 | Maltrap |

(Continued)

FOREIGN PATENT DOCUMENTS

| | | |
|---|---|---|
| DE | 29900305 | 5/1999 |
| DE | 202005017020 | 2/2006 |

(Continued)

OTHER PUBLICATIONS

U.S. Searching Authority, International Search Report and Written Opinion for corresponding application PCT/US2016/057002 dated (Dec. 22, 2016).

*Primary Examiner* — Thomas Ingram
(74) *Attorney, Agent, or Firm* — Fay Sharpe LLP

(57) ABSTRACT

A autonomous robotic golf caddy which is capable of following a portable receiver at a pre-determined distance, and which is capable of sensing a potential impending collision with an object in its path and stop prior to said potential impending collision.

32 Claims, 7 Drawing Sheets

(56) References Cited

U.S. PATENT DOCUMENTS

| | | |
|---|---|---|
| 3,648,795 A | 3/1972 | Moulton |
| 3,704,758 A | 12/1972 | Cropp |
| 3,731,756 A | 5/1973 | Hajec |
| 3,812,929 A | 5/1974 | Farque |
| 3,815,699 A | 6/1974 | Ganskopp et al. |
| 4,063,612 A | 12/1977 | Weiss |
| 4,081,047 A | 5/1978 | Lovell et al. |
| 4,105,084 A | 8/1978 | Baak |
| 4,356,875 A | 11/1982 | Clune |
| 4,532,710 A | 8/1985 | Kinney et al. |
| 4,538,696 A | 9/1985 | Carter |
| 4,657,100 A | 4/1987 | Lewis |
| 4,762,193 A | 8/1988 | Levine |
| 4,844,493 A | 7/1989 | Kramer |
| 4,848,497 A | 7/1989 | LaGuilharre |
| 4,974,693 A | 12/1990 | Nakai et al. |
| 5,137,103 A | 8/1992 | Cartmell |
| 5,161,635 A | 11/1992 | Kiffe |
| 5,167,389 A | 12/1992 | Reimers |
| 5,180,023 A | 1/1993 | Reimers |
| 5,307,889 A | 5/1994 | Bohannan |
| 5,517,098 A | 5/1996 | Dong |
| 5,526,894 A * | 6/1996 | Wang ............... B62B 1/045 180/65.1 |
| D374,957 S | 10/1996 | Keller |
| 5,711,388 A * | 1/1998 | Davies ............... A63B 24/0021 180/168 |
| 5,810,105 A * | 9/1998 | Trainer ............... G05D 1/0255 180/169 |
| 5,944,132 A * | 8/1999 | Davies ............... A63B 24/0021 180/168 |
| 6,062,328 A | 5/2000 | Campbell et al. |
| 6,142,251 A * | 11/2000 | Bail ............... B62B 5/0026 180/167 |
| D438,682 S | 3/2001 | Furuta et al. |
| 6,283,238 B1 | 9/2001 | Royer |
| 6,404,159 B1 * | 6/2002 | Cavallini ............... B60L 3/0015 318/580 |
| 6,474,427 B1 | 11/2002 | Tunnecliff |
| 6,659,208 B2 | 12/2003 | Gaffney et al. |
| 6,659,210 B2 | 12/2003 | Tyson |
| 6,732,823 B2 | 5/2004 | Furuta |
| 6,907,949 B1 | 6/2005 | Wang |
| 6,942,238 B1 | 9/2005 | DeCarlo |
| D522,706 S | 6/2006 | Stewart et al. |
| 7,293,619 B2 | 11/2007 | Mitchell, Jr. |
| D573,771 S | 7/2008 | Ball et al. |
| 8,365,850 B2 | 2/2013 | Gal et al. |
| 8,573,338 B2 | 11/2013 | Gal et al. |
| 2002/0148657 A1* | 10/2002 | Tyson ............... B62B 5/0026 180/65.1 |
| 2003/0159864 A1* | 8/2003 | Furuta ............... B62B 3/10 180/65.1 |
| 2003/0173122 A1* | 9/2003 | Cassoni ............... B62B 5/0003 180/65.1 |
| 2004/0193348 A1 | 9/2004 | Gray et al. |
| 2005/0115548 A1* | 6/2005 | Wilson ............... A63B 55/00 124/56 |
| 2008/0023236 A1* | 1/2008 | Falkiner ............... A63B 55/61 180/65.1 |
| 2008/0027591 A1* | 1/2008 | Lenser ............... G05D 1/0274 701/2 |
| 2009/0038864 A1* | 2/2009 | Yun ............... B62B 1/045 180/19.1 |
| 2010/0168934 A1* | 7/2010 | Ball ............... G05D 1/0242 701/2 |
| 2010/0241290 A1* | 9/2010 | Doane ............... G05D 1/028 701/2 |
| 2012/0118657 A1 | 5/2012 | Liao |
| 2013/0098700 A1* | 4/2013 | Zhang ............... G05D 1/0255 180/167 |
| 2015/0136506 A1* | 5/2015 | Quinn ............... B60K 1/00 180/180 |
| 2015/0327638 A1* | 11/2015 | Ghosh ............... A45C 5/14 180/167 |
| 2017/0050659 A1* | 2/2017 | Cardano ............... B62B 5/0069 |

FOREIGN PATENT DOCUMENTS

| | | |
|---|---|---|
| DE | 202010016119 | 3/2011 |
| DE | 202012102516 | 9/2012 |
| DE | 202012105019 | 3/2013 |
| EP | 637460 | 4/1998 |
| ES | 2342912 | 7/2010 |
| FR | 2653672 | 5/1991 |
| GB | 2221661 | 2/1990 |
| GB | 2283838 | 12/1997 |
| GB | 2332723 | 6/1999 |
| GB | 2332724 | 6/1999 |
| JP | 60128064 | 7/1985 |
| JP | 5301586 | 11/1993 |
| JP | 2007080191 | 3/2007 |
| WO | 1998045154 | 10/1998 |
| WO | 2008089576 | 7/2008 |
| WO | 2013059418 | 4/2013 |
| WO | 2013059423 | 4/2013 |

* cited by examiner

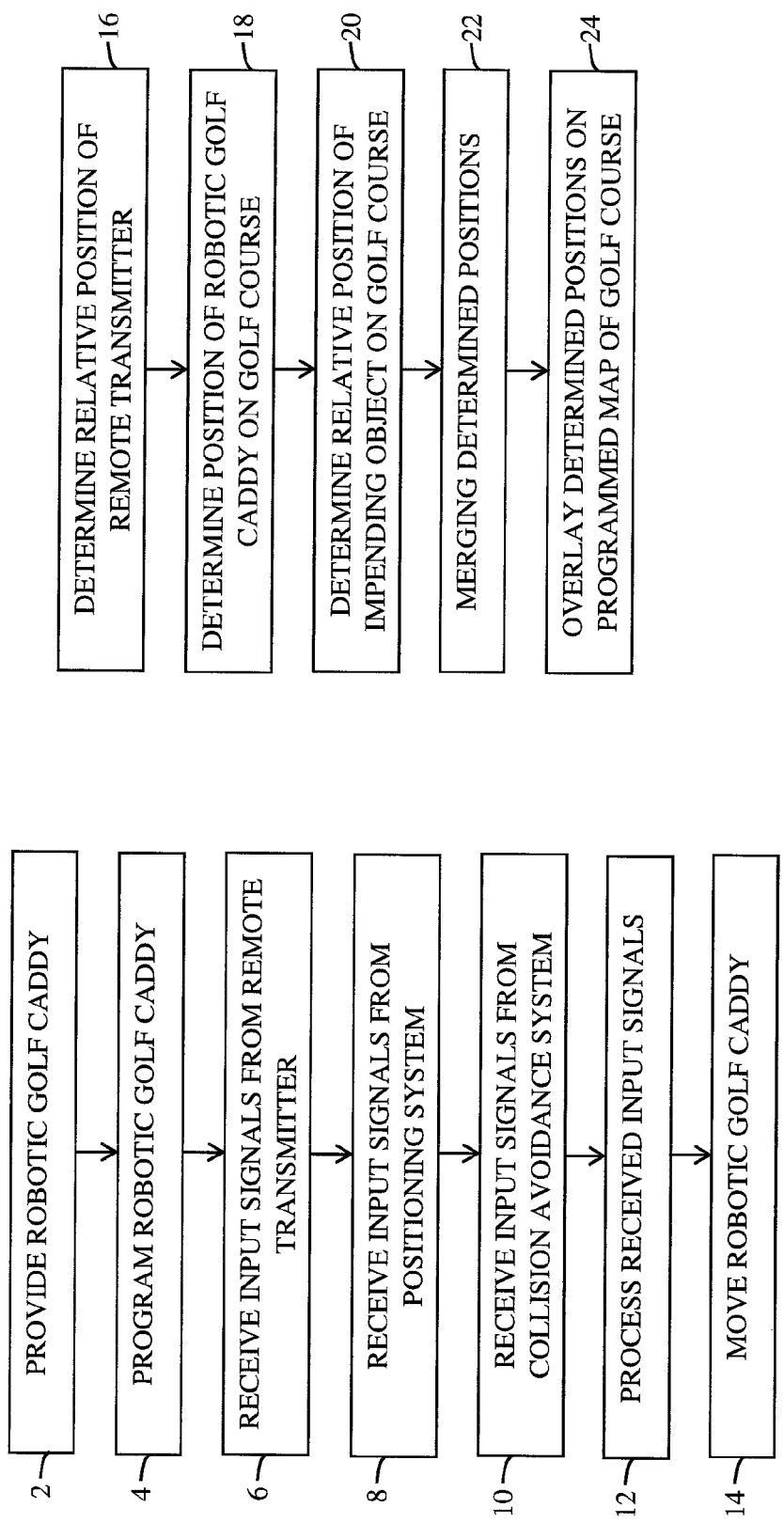

ROBOTIC GOLF CADDY

The present invention claims priority on U.S. Provisional Patent Application Ser. No. 62/242,349, filed Oct. 16, 2015, which is incorporated herein by reference.

The present invention relates to robotic devices, particularly to a robotic golf caddy, and more particularly to an autonomous robotic golf caddy which is capable of following a portable receiver at a pre-determined distance, and which is capable of sensing an unacceptable or unauthorized location and/or an impending collision with an object in its path and stops prior to said collision and/or stop prior to entering an unacceptable or unauthorized location.

BACKGROUND ON THE INVENTION

Various robotic golf caddies have been developed using one or more guidance methods and a drive mechanism to automatically follow a golf player around the golf course. Non-limiting examples of such golf caddies are illustrated in US Publication No. 2010/0168934; U.S. Pat. Nos. 8,573,338; 6,142,251; 5,963,150; 5,944,132; 5,711,388; 5,611,406; 3,812,929; EP 1060091; and WO 2013059423. These various guidance systems have used various techniques to guide such golf caddies.

The present invention is directed to an improvement over prior art golf caddies.

SUMMARY OF THE INVENTION

The present invention is directed to an autonomous robotic golf caddy that is responsive to a signal (e.g., radio signal, ultrasonic signal, infrared signal, etc.). The size, shape, configuration and materials of the robotic golf caddy are non-limiting. In one non-limiting arrangement of the present invention, the robotic golf caddy includes a vehicle frame, a vehicle housing, a receiver arrangement, a plurality of sensors, a processor unit, a motor, a plurality of wheels, and a remote transmitter. The robotic golf caddy is configured to receive one or more signals from the remote transmitter that is located on a golfer and to use such signals to follow the golfer on a golf course. The robotic golf caddy is configured to include various sensors and navigational tools to determine and/or sense the immediate environment about the robotic golf caddy and to determine if the robotic caddy is in or moving toward an unacceptable or unauthorized location and/or if there is an impending collision with an object in the path of the robotic golf caddy to enable the golf caddy to make a determination whether to stop or relocate itself.

The remote transmitter can be worn, such as, for example, on a belt and/or placed in a pocket, or can be carried by the golfer. The remote transmitter can optionally include a housing, a belt clip, a radio transceiver, a battery and/or an antenna system; however, this is not required.

The receiver arrangement on the robotic golf caddy is designed to receive signals from the remote transmitter and then forward that information to the processor unit to process such information to enable the robotic golf caddy to follow the golfer on and off a golf course. The remote transmitter and receiver arrangement on the robotic golf caddy that is designed to receive signals from the remote transmitter is the golfer tracking arrangement.

The plurality of sensors on the robotic golf caddy can provide additional information to the processor unit to ensure that the robotic golf caddy properly follows the golfer on and off the golf course.

In another and/or alternative non-limiting aspect of the present invention, the robotic golf caddy includes a vehicle frame having a drive mechanism mounted thereon. The drive mechanism typically comprises at least one wheel driven by at least one motor (e.g., electric motor, gas-powered motor, etc.). The drive mechanism is connectable to the vehicle frame and is configured to cause the robotic golf caddy to move in response to a signal from the processor unit. In one non-limiting embodiment, the robotic golf caddy has three wheels; however, more or fewer wheels can be used. In one specific non-limiting embodiment, the robotic golf caddy includes three wheels with one or both rear wheels being driven by the motor; however, this is not required. As can be appreciated, one motor can be associated with each of the rear wheels; however, this is not required. Alternatively, a single motor, such as, for example, a single motor having a differential gearing to drive both rear wheels can be used; however, this is not required. Furthermore, a motor which utilizes a reduction gear box can be used; however, this is not required. The drive mechanism can additionally include a power source (e.g., a battery, etc.) coupled to the motor to provide power to the drive mechanism. The drive mechanism typically includes at least one front wheel configured to steer the robotic golf caddy in accordance with control signals (e.g., processor signal) from the robotic caddy and/or remote transmitter; however, this is not required. As can be appreciated, the rotational speed of the rear wheels can be used to control the steering of the robotic golf caddy in accordance with control signals; however, this is not required. In one non-limiting embodiment of the present invention, the robotic golf caddy includes two rear wheels fixed to each end of a drive axle, and a front wheel which is connected to a bottom portion of the vehicle frame such that the front wheel can rotate approximately 360° around a pivot connection arrangement; however, this is not required. In such an embodiment, the two rear wheels are configured to move the robotic golf caddy forward and/or backward while the front wheel is configured to steer the robotic golf caddy. The size, shape and configuration of the wheels are non-limiting. The wheels are generally selected to maintain a balance of properties including, but not limited to, improved traction, improved wear resistance, and/or improved reliability.

In another and/or alternative non-limiting aspect of the present invention, the robotic golf caddy includes a processor unit that includes one or more processors which can be used to control the one or more functions of the robotic golf caddy, including, but not limited to, the drive mechanism of the robotic golf caddy. The processor unit can be configured to control the drive mechanism so that the robotic golf caddy properly follows a golfer on and off a golf course. In one non-limiting configuration, the processor unit includes a memory unit and software; however, this is not required. As such, the processor unit can include preprogrammed software and/or information to control the operation of the robotic golf caddy; however, the processor unit can also be designed to be programmable. Such information can include, but is not limited to, a map of the golf course, topography of the golf course, barriers and obstacles on the golf course, movement limitations of the robotic golf caddy on the golf course, etc. The processor unit can also or alternatively use information received from sensors, GPS, Bluetooth™ and/or other wireless technologies (as described later) to control the operation of the robotic golf caddy; however, this is not required. In one non-limiting configuration, the processor unit is in communication with at least one receiver of the robotic golf caddy. As such, the processor unit can be programmed to process an input received from the at least one receiver to determine a position of the remote transmitter and to cause the robotic golf caddy to move relative to the remote transmitter in accordance with the programming of the processor unit; however, this is not required.

In another and/or alternative non-limiting aspect of the present invention, the robotic golf caddy includes at least one receiver configured to receive a signal from a remote transmitter which can be held by or attached to a golfer as the golfer moves on a golf course. The signal from the remote transmitter can be used to provide a variety of different information to the processor unit to enable the processor unit to properly control the robotic golf caddy. Such information can include, but is not limited to, the distance of the robotic golf caddy from the golfer, the speed at which the robotic golf caddy is approaching the golfer, the speed at which the golfer is moving on the golf course, the direction the golfer is moving on the golf course, the difference in speed between the golfer and the robotic golf caddy, the difference in direction of movement between the golfer and the robotic golf caddy, etc. The information from the remote transmitter can be used to maintain a proper distance of the robotic golf caddy from the golfer as the golfer moves on and off the golf course.

In another and/or alternative non-limiting aspect of the present invention, the robotic golf caddy includes a plurality of sensors positionable on one or more locations of the robotic golf caddy. The plurality of sensors can be configured to provide a variety of different information to the processor unit, thereby enabling the processor unit to properly control the robotic golf caddy. Such information can include, but is not limited to, the speed of the robotic golf caddy, the distance of the robotic golf caddy from the golfer, the speed at which the robotic golf caddy is approaching the golfer, the speed at which the golfer is moving on the golf course, the direction the golfer is moving on the golf course, the difference in speed between the golfer and the robotic golf caddy, the difference in direction of movement between the golfer and the robotic golf caddy, topography of the golf course, barriers and obstacles on the golf course (e.g., trees, bushes, vegetation, lakes, ponds, rivers, sand traps, out of bounds lines, rocky regions, cliffs, steep slopes, gardens, steps, bridges, fences, gates, buildings, stakes and other markers, fountains, benches, chairs, golf ball cleaners, beverage dispensers, trash cans, trash and debris on and off the golf course, restroom, snack bar and other structures, other people on and off the golf course, animals, other golf carts, other golf caddies, other vehicles, etc.), position of other golfers, golf equipment on the ground, golf balls on the ground, etc. The information from the plurality of sensors can be used to maintain a proper distance of the robotic golf caddy from the golfer as the golfer moves on the golf course, staying within an acceptable or authorized location and/or avoiding a collision with an object in its path. As can be appreciated, the sensors can be also used to locate a golf ball of a golfer; however, this is not required. The plurality of sensors can be configured to operate together as part of at least one system (e.g., collision avoidance arrangement, navigation arrangement, etc.); however, this is not required. As can be appreciated, at least one of the plurality of sensors can be configured to operate independently (e.g., gradient sensor, lateral sensor, etc.) from one or more other sensors; however, this is not required. In another and/or alternative non-limiting aspect of the present invention, the information from the plurality of sensors can also or alternatively be used to enable the robotic golf caddy to avoid hazards, obstacles, etc. on and off the golf course and/or to avoid certain areas of a golf course (e.g., putting green, practice range, parking lot, club house, etc.) as the robotic golf caddy follows the golfer on the golf course. Non-limiting examples of the one or more sensor systems that can be used in the robotic golf caddy include LIDAR, RF-based sensor system for collision avoidance, ultrasonic sensor system, ultra-wide band sensor system, etc.

In yet another and/or alternative non-limiting aspect of the present invention, the robotic golf caddy includes a navigation arrangement configured to control the movement of the robotic golf caddy on and off the golf course; however, this is not required. As such, information from the plurality of sensors can also or alternatively be used to control the movement of the robotic golf caddy on and off the golf course; however, this is not required. The types and number of sensors that can be used are non-limiting. A LIDAR sensor system (when used), generally uses ultraviolet, visible and/or near infrared light to image objects. Furthermore, a LIDAR sensor system (when used) can utilize "incoherent" or direct energy detection and/or coherent detection; however, this is not required. Generally, a micropulse LIDAR system (when used) requires less energy and is "eye-safe." The LIDAR system (when used) typically includes one or more lasers (e.g., 500-2000 nm laser, etc.), photodetectors and receiver electronics (e.g., solid state photodetectors [silicon avalanche photodiodes, photomultipliers, etc.]), and position and navigation arrangements (e.g., Global Positioning System receiver, Inertial Measurement Unit (IMU), etc.). Although narrowband technology (e.g., RF system, LIDAR system, etc.) can be used, in some instances it can be susceptible to multipath interference. In this regard, the signal can be distorted because it takes many different paths to reach the receiver, thereby potentially resulting in loss of signal tracking, veering off course, or complete shut-down of the system. In addition to the potential problems associated with multipath interference when using narrowband technology, narrowband technology can also experience interference from metal objects on a golf course (e.g., bridges, buildings, etc.) which can potentially result in a loss of signal tracking. Similarly, high-voltage electrical sources (e.g., unshielded conduits on the golf course, etc.) can also interfere with signal tracking. Such interference can result in loss of communication between the golfer and robotic golf caddy, thereby potentially causing the robotic golf caddy to potentially veer off course and/or shut down. One alternative to narrowband technology is to use ultra-wide band technology to transmit information spread over a large bandwidth (e.g., greater than 500 MHz, etc.). When ultra-wide band technology is used, objects in real time and/or near-real time can be located with high precision (e.g., within 3 feet, within 1 foot, within 10 cm, etc.). In one non-limiting embodiment of the present invention, the robotic golf caddy utilizes an ultra-wide band sensor system to assist in navigation; however, this is not required. In one non-limiting arrangement, an ultra-wide band sensor system is used by the robotic golf caddy, and is configured to operate at about 20-200 megapulses per second (and all values and ranges therebetween) (e.g., 40 megapulses per second); however, this is not required. In another and/or alternative non-limiting arrangement, an ultra-wide band bandwidth sensor system which uses a three-antenna system is used by the robotic golf caddy; however, this is not required. One source of ultra-wide band bandwidth sensors that can optionally be used are offered by decaWave™ (DWM1000 Module). The decaWave™ system (when used) can be used for maneuverability of the robotic golf caddy;

however, this is not required. The decaWave™ system can provide several non-limiting advantages including, but not limited to, the ability to locate objects within 10 cm accuracy, capable of identifying up to about 10,000 items within a 20 meter radius, offer both one-way and two-way ranging capabilities, and is generally unaffected by multipath fading. As can be appreciated, Bluetooth™ and/or other wireless technologies can also be optionally used for tracking between the golfer and robotic golf caddy and/or for navigation of the robotic golf caddy. Generally, the robotic golf caddy includes at least two different types of sensors; however, this is not required. In one non-limiting arrangement, the robotic golf caddy includes one or more ultrasonic sensors that are primarily used for collision avoidance as the robotic golf caddy moves in forward direction. As such, the one or more ultrasonic sensors are used to primarily detect objects in front of the robotic golf caddy. In this non-limiting arrangement, the robotic golf caddy also includes one or more ultra-wide band bandwidth sensors. These sensors are used to detect objects located about the robotic golf caddy and not just in front of the robotic golf caddy. Generally, the object detection range of the one or more ultra-wide band bandwidth sensors is greater than the one or more ultrasonic sensors; however, this is not required. In one specific configuration, the robotic golf caddy includes 2-8 ultrasonic or LIDAR sensors and 2-6 wide band bandwidth sensors. The ultrasonic or LIDAR sensors can be position in any region about the robotic golf caddy. The LIDAR and/or ultrasonic collision avoidance arrangement can be used to detect objects up to 100+ ft. (e.g., 0-500 ft. and all values and ranges therebetween) from the robotic golf caddy; the robotic golf caddy can use such information to avoid collision with such objects. The wide band bandwidth sensor arrangement is used to complement the LIDAR and/or ultrasonic collision avoidance arrangement to provide additional information about objects located about the robotic golf caddy. The wide band bandwidth sensor arrangement can also be used to detect objects up to 100+ ft. (e.g., 0-500 ft. and all values and ranges therebetween) from the robotic golf caddy so that the robotic golf caddy can use such information to avoid collision with such object. In one non-limiting design, a LIDAR or ultrasonic sensor is located at three regions about the robotic golf caddy. Such a configuration can be used to detect collision by the robotic golf caddy at all locations about the robotic golf caddy. As can be appreciated, more than three or less than three LIDAR or ultrasonic sensors can be used. Also for this non-limiting design, the robotic golf caddy includes three wide band bandwidth sensors. The combined information from these two sensor arrangement can be used by the processor unit to move the robotic golf caddy clear of objects on the golf course and to safely and effectively cause the robotic golf caddy to follow a golfer on the golf course. The third sensor arrangement, namely the remote transmitter/receiver arrangement between the robotic golf caddy and the remote transmitter/receiver on the golfer, ensures that the robotic golf caddy follows the golfer on the golf course.

In another and/or alternative non-limiting aspect of the present invention, the robotic golf caddy includes a collision avoidance arrangement which is capable of determining whether an object of sufficient mass is in a path of movement of the robotic golf caddy. The collision avoidance arrangement can be configured to determine whether an object is within a specified minimum distance around the robotic golf caddy; however, this is not required. When it is determined that an object of sufficient mass is in the path of movement of the robotic golf caddy, and/or when the object is within a specified minimum distance of the robotic golf caddy, the processor unit can use such information to stop the robotic golf caddy, adjust the speed of the robotic caddy, and/or reroute the robotic golf caddy around the object. As such, the collision avoidance arrangement of the robotic golf caddy enables the robotic golf caddy to avoid or stop before it contacts an object. In one non-limiting configuration, the collision avoidance arrangement utilizes a plurality of sensors spaced about the robotic golf caddy. The type of sensor used in the collision avoidance arrangement is non-limiting and can include sensors, such as, for example, RF sensors, ultra-wide band bandwidth sensors, ultra-sound sensors, infrared sensors, etc. In one non-limiting arrangement, the collision avoidance arrangement utilizes a plurality of ultra-sound sensors for object detection; however, this is not required. In one non-limiting arrangement, the robotic golf caddy includes from about 1 to about 40 sensors (and all ranges or values therebetween), and more typically from at least 2 to about 20 sensors; however, this is not required. In one specific non-limiting arrangement, the robotic golf caddy includes 4 ultra-sound sensors positioned around the robotic golf caddy; however, this is not required. The size, shape and type of sensor is non-limiting. As can be appreciated, one or more of the sensors can be angled so as to facilitate placement on a corner and/or angled portion of the robotic golf caddy. One or more of the sensors can have a non-overlapping field of coverage; however, this is not required. The collision avoidance arrangement can be used to detect objects at varying distances (e.g., 0.001-100 feet, etc.) from the sensors. The processor unit can include rules and/or limitations forming part of the processor programming which are configured to direct the operation of the robotic golf caddy when an object is detected by the sensors of the collision avoidance arrangement; however, this is not required. The robotic golf caddy may also include a satellite navigation arrangement and/or programmed map to assist in controlling the movement of the robotic golf caddy in a defined area. In another and/or alternative non-limiting arrangement, the robotic golf caddy is configured to emit a sound when a potential impending collision is within a certain, predetermined radius of the robotic golf caddy; however, this is not required. In another and/or alternative non-limiting arrangement, the collision avoidance arrangement has an accuracy within about 1-1000 cm (and all values and ranges therebetween); however, this is not required. In another and/or alternative non-limiting arrangement, the collision avoidance arrangement transmits at a frequency of about 100-1000 MHz (and all values and ranges therebetween) (e.g., 433 MHz); however, this is not required.

In another and/or alternative non-limiting aspect of the present invention, the position of objects on the golf course can continuously be determined via the plurality of sensors on the robotic golf caddy. In one non-limiting arrangement, when the golfer is walking down the golf course along a path and an object, such as, for example, a rock, bench, light, etc. has been placed on the path, the plurality of sensors on the robotic golf caddy are capable of sensing the object. Furthermore, the sensors are capable of sending a signal to the processor unit of the robotic golf caddy that an object is in its path. The processor unit is configured to be capable of distinguishing the potential impending collision by signals received from the one or more sensors, thereby preventing the robotic golf caddy from a collision therewith. In another and/or alternative non-limiting aspect of the present invention, the determined position of objects in the path of the robotic golf caddy can be overlaid over a programmed map of the golf course and/or Google® map of the golf course, and/or all or a portion of a golf course map being transmitted to the robotic golf caddy; however, this is not required. As such, the processor unit can determine the best possible path of movement around the object in the path of the robotic golf caddy. Thus, the plurality of sensors on the robotic golf caddy can be used to (i) sense, and/or (ii) prevent impending collisions with objects on the golf course. In one non-limiting arrangement, the plurality of sensors is used to continuously determine whether an object is in the path of the robotic golf caddy when the robotic golf caddy is being used on and off a golf course. In operation, the collision avoidance arrangement can detect a potential impending collision by: (i) sensing a presence of a potential impending object using at least one ultrasound sensor mounted to a housing of the robotic golf caddy, (ii) determining whether the sensed potential impending object is a moving object or stationary object using a processor unit in communication with at least one ultrasound sensors, (iii) determining the position of the sensed potential impending object, and (iv) moving the robotic golf caddy around the sensed potential impending object in response to an output signal from the processor unit.

In another and/or alternative non-limiting aspect of the present invention, the robotic golf caddy can optionally include an image capturing system; however, this is not required. The image capturing system (when used) can be mounted to the robotic golf caddy, and can include at least one camera (e.g., digital camera, video camera, digital video camera, etc.) capable of capturing frame images. The image capturing system (when used) can optionally include an information storage unit capable of storing the captured frame images, and/or a captured frame image classification unit capable of processing the captured frame images by operations utilizing, such as, for example, image classification technology, image recognition technology, image decoding technology, etc. The image capturing system (when used) can be in communication with the processor unit to be used to assist in the navigation of the robotic golf caddy; however, this is not required. Also or alternatively, one or more of the images captured by the image capturing systems can be transmitted to a remote location (e.g., the golf course club house, etc.); however, this is not required. As such, if a bench, for example, is detected by the collision avoidance arrangement as being in the path of movement of the robotic golf caddy, the image capturing system (when used) can optionally capture frame images of the object, and decode the object as being a bench in the path of the robotic golf caddy. A signal can be sent back to the club house alerting golf course employees that an object decoded as being a bench is out of place on the golf course. Also, if an unexpected object is detected by the collision avoidance arrangement of the robotic golf caddy, an image of such object can optionally be transmitted to a remote location such as a golf course club house, alerting golf course employees that an object is out of place on the golf course.

In another and/or alternative non-limiting aspect of the present invention, the robotic golf caddy can optionally include at least one lateral sensor mounted to the robotic golf caddy that is configured to detect a sideways tipping movement of the robotic golf caddy; however, this is not required. The at least one lateral sensor (when used) can be in communication with the processor unit. The processor unit can be configured to distinguish the sideways tipping movement of the robotic golf caddy by signals received from the one or more lateral sensor, and, if a signal is over a predetermined limit, the processor unit will stop or alter the direction of movement of the robotic golf caddy to prevent the robotic golf caddy from tipping over. The lateral sensor can be in the form of an accelerometer that is located on the robotic golf caddy and/or on the remote transmitter. The accelerometer can be used to detect angles, slopes, yaw, etc. as the golfer and/or robotic golf caddy moves over a ground surface. This information can be used by the processor unit of the robotic golf caddy to adjust the speed and/or direction of movement of the robotic golf caddy.

In another and/or alternative non-limiting aspect of the present invention, the robotic golf caddy can optionally include a gradient sensor mounted to the robotic golf caddy and capable of sensing the incline of a gradient; however, this is not required. The at least one gradient sensor (when used) can be in communication with the processor unit. The processor unit can be configured to distinguish the gradient by signals received from the one or more gradient sensors, and, and, if a signal is over a predetermined limit, the processor unit will stop or alter the direction of movement of the robotic golf caddy to prevent the robotic golf caddy from going up or down a too steep of gradient. The gradient sensor can be in the form of an accelerometer that is located on the robotic golf caddy and/or on the remote transmitter. The accelerometer can be used to detect angles, slopes, yaw, etc. as the golfer and/or robotic golf caddy moves over a ground surface. This information can be used by the processor unit of the robotic golf caddy to adjust the speed and/or direction of movement of the robotic golf caddy.

In another and/or alternative non-limiting aspect of the present invention, the robotic golf caddy can include a Global Positioning System (GPS). The type of GPS is non-limiting. As can be appreciated other systems such as LORAN system or GSM system can also or alternatively be used. The GPS can be configured to be preprogrammed with golf course maps; however, this is not required. As can be appreciated, the GPS can be configured to be programmed; however, this is not required. As such, the GPS system can optionally include a connection arrangement (e.g., wireless connection, wired connection, etc.) to enable programming of the GPS system with information, such as, for example, golf course map information. The GPS device can be configured to send information to a display so as to display information to the user, including, but not limited to, the golf hole number, distance to the center of the green, distance to the front of the green, distance to the back of the green, etc. In operation, the GPS system can automatically advance to the next golf hole as a user moves around the golf course; however, this is not required. As can be appreciated, the GPS system can be manually operated so as to select a different golf hole different than the current golf hole. In one non-limiting arrangement, the GPS system includes a shot distance feature designed to allow a user to easily and conveniently determine a distance between any location on a golf course (e.g., distance between the robotic golf caddy and/golf ball and the hole, distance between robotic golf caddy and/golf ball and pond, distance between robotic golf caddy and/golf ball and sand bunker, distance between robotic golf caddy and/golf ball and creek, distance between robotic golf caddy and/golf ball and a hazard, etc.); however, this is not required.

In another and/or alternative non-limiting aspect of the present invention, the robotic golf caddy can use the GPS, LORAN system, and/or GSM system, and one or more sensors as a tracking system, navigation arrangement and/or collision avoidance arrangement for the robotic golf caddy; however, this is not required. In one non-limiting arrangement, the robotic golf caddy includes a GPS-based tracking device to locate the position of the robotic golf caddy in real time or near-real-time, anywhere in the world; however, this is not required. As can be appreciated, other types of tracking devices can be used. In one non-limiting arrangement, the GPS-based tracking device is hard-wired into a power supply (e.g., a battery) of the robotic golf caddy; however, this is not required. The GPS-based tracking system is capable of tracking the position of the robotic golf caddy on a golf course in real time or near-real time. The information from the GPS-based tracking device can be used to prevent damage to the robotic golf caddy, prevent theft of the robotic golf caddy, and locate the position of golfers using robotic golf caddies on the golf course, etc., as the robotic golf caddy moves on the golf course. The GPS-based tracking device can also or alternatively provide information, such as, but not limited to, providing a detailed history of where each robotic golf caddy has been, tracking the number and type of golf courses (e.g., number of 9 hole golf courses, number of 18 hole golf courses, etc.) the robotic golf caddy has completed, track the hours of use of the robotic golf caddy, track distance the robotic caddy as traveled in an hour, day, week, month, year, of life of robotic golf caddy, etc. The GPS-based tracking device can optionally include a "Geo Fencing" system to track key areas of interest, and, if needed, alerts can be created and sent to a robotic golf caddy in that area; however, this is not required. The GPS-based tracking device can also or alternatively identify "Hot Spots" on the golf course (e.g., unsafe places, repair locations, high use areas, etc.). In one non-limiting arrangement, the robotic golf caddy can create an alert when it is brought into one of these specified areas; however, this is not required. Generally, "Geo Fences" are limited only by the imagination of the user (e.g., "Cart Path Only," "Pace of Play," etc.) and can be controlled on a unit-by-unit basis such that each robotic golf caddy has an individual fence, or across all robotic golf caddies such that all robotic golf caddies share the same fence. As such, Geo Fencing information can be sent to the robotic golf caddy to force the robotic golf caddy to remain on the cart path when the golf course is wet. Geo Fencing information can be sent to the robotic golf caddy to force the robotic golf caddy to avoid certain areas, such as areas under repair, areas near a driving range, areas outside the golf course, out of bounds areas on a golf course, etc. As can be appreciated, the Geo Fencing information can be periodically updated via wireless or wired communication with the robotic caddy. The GPS-based tracking device can also or alternatively be used to monitor proper operation of the robotic golf caddy. For example, it the robotic golf caddy is moving too fast, too slow and/or at an irregular pace, such information and/or alert can be sent to the golfer and/or to a remote monitoring location. This information can be used to stop the robotic golf caddy, reset the robotic golf caddy, or have maintenance sent to the robotic golf caddy. Likewise, if the robotic golf caddy is having a battery problem (e.g., defective battery, low battery life, etc.), or is having electronic or mechanical problems (e.g., one of the sensors is not properly working, GPS not properly working, display fault or failure, drive mechanism fault or failure, flat tire, etc.), such information and/or alert can be sent to the golfer and/or to a remote monitoring location. This information can be used to stop the robotic golf caddy, reset the robotic golf caddy, or have maintenance sent to the robotic golf caddy. Also, it the robotic golf caddy is somehow damaged during use, such information and/or alert can be sent to the golfer and/or to a remote monitoring location. This information can be used to stop the robotic golf caddy, reset the robotic golf caddy, or have maintenance sent to the robotic golf caddy.

In another or alternative non-limiting aspect of the invention, the robotic golf caddy can monitor battery capacity, and, if needed, create alerts to indicate a battery problem.

In another or alternative non-limiting aspect of the invention, the robotic golf caddy can provide an "SOS" button and, if needed, can create alerts broadcasting the exact position of the robotic golf caddy.

In another or alternative non-limiting aspect of the invention, the robotic golf caddy can include one or more displays, and/or transmit information to a smart device (e.g., smart phone, tablet, laptop, etc.) being used by the golfer. The robotic golf caddy can be configured to transmit information to a remote location for being viewed real-time, near-real-time or at some later time at a remote location (e.g., data center, remote computer, etc.); however, this is not required. As can be appreciated, information from the robotic golf caddy can be transmitted to a smart device to be displayed on the smart device; however, this is not required. The information collected and/or sensed by the robotic golf caddy can optionally be stored in a memory unit of the robotic golf caddy for later viewing and/or downloading and/or can be transmitted real-time, near-real-time or at designated time intervals to a remote storage facility.

In another and/or alternative non-limiting aspect of the present invention, the robotic golf caddy can include a GPS and/or GSM system, LORAN system, Bluetooth™ technology and/or other wireless technology, and/or a programmed map/information of the golf course and use various types of signals (e.g., ultrasonic signals, infrared signals, radio waves, etc.) to provide a variety of information to the processor unit to enable the processor unit to properly control the robotic golf caddy and/or provide information to the golfer. Such information can include, but is not limited to, the speed of the robotic golf caddy, topography of the golf course, barriers and/or obstacles on the golf course (e.g., trees, bushes, lakes, rivers, sand traps, out of bounds lines, rocky regions, cliffs, steep slopes, gardens, steps, bridges, etc.), location of the robotic golf caddy on the golf course, hole the robotic caddy is on, time period of play, speed of play, etc. The information from the GPS and/or GSM system and/or programmed map/information can be used to prevent damage to the robotic golf caddy, prevent the robotic golf caddy from being stuck in a hazard on the golf course, navigate obstacles in the golf course, prevent the robotic golf caddy from moving into an unauthorized or undesired region on the golf course, etc., as the robotic golf caddy moves on and off the golf course. The GPS and/or GSM system and/or programmed map/information of the golf course (when used) can also or alternatively provide other information to the golfer, such as, but not limited to, a map of the golf course, a map of a particular hole, the distance to the green, the distance to the hole, recommended club based on position of the robotic golf caddy, recommended location to hit golf ball on course based on position of the robotic golf caddy, recommended strategies for a golf hole, topography of the golf course, topography of a particular golf hole, location of hazards on golf course, location of restrooms, location of cart paths, directions to next hole, location of club house, location of robotic golf caddy return, par information for a particular golf hole, information about the difficulty of golf course and/or golf hole, history of golf course and/or golf hole, date, time, USGA™ rules, score card, course sponsors, golf wager management, warning information about playing too slow on course, provide golfer information about current whether conditions at location, provide golfer warning or weather updates about current or future weather in area, shooting order based on distance from the green or hole, recommendation as to where to hit the ball on the golf course, wind speed, wind direction, contest information, scores of golfers, etc. The information from the GPS and/or GSM system can also be used to track the robotic golf caddy on the golf course, inhibit or prevent theft of the robotic golf caddy, locate golfers on the golf course, provide a minute by minute or some other time interval record of where the robotic golf caddy has been during a certain time period, determine usage of the robotic caddy (e.g., time of use, use of 9 or 18 holes, etc.), alerts golfer that area is out of bounds or in an unauthorized area, tracks battery usage, alerts golfer or a command location of a low battery and/or possible error or fault in the robotic golf caddy, allow geo-fences to be transmitted or programmed to robotic golf caddy to limit the movement and/or the locations that the robotic golf caddy can move or enter, provide pace of play alerts to the golfer, alert golfers that the robotic golf caddy is going too fast, etc. The robotic golf caddy can optionally include an SOS button that can be used by the golfer to send location information to a central location or club house to indicate that the golfer needs assistance. The information from the GPS and/or GSM system and/or programmed map/information can be displayed on one or more of the displays on the robotic golf caddy, transmitted to a smart device (e.g., smart phone, tablet) being used by the golfer, and/or viewed real-time, near-real-time or at some later time at a remote location (e.g., data center, remote computer, etc.); however, this is not required. The technology on the robotic golf caddy can be used to contact, send warnings and/or communicate with the golfer that is using the robotic golf caddy. If the robotic golf caddy has a malfunction, gets stuck or trapped in a location on the golf course, does not move for extended periods of time due to a failure or fault on the robotic golf caddy and/or the golfer is injured or has a condition that prevents the golfer from moving, a warning signal and/or location signal can be sent to a remote location and/or transmitted and/or communicated to the golfer. As can be appreciated, information from the GPS and/or GSM system and/or programmed map/information of the robotic golf caddy can be transmitted to a smart device (when used) to be displayed on the smart device; however, this is not required. The information from the GPS and/or GSM system can be stored in memory on the robotic golf caddy for later viewing and/or downloading and/or can be transmitted real-time, near-real-time or at designated time intervals to a remote storage facility.

In another and/or alternative non-limiting aspect of the present invention, the robotic golf caddy can include a wireless (e.g., Bluetooth™, WiFi™, etc.) and/or wired connection (e.g., USB™ cable, Firewire™, HOMI cable, etc.) that can be used to connect to a smart device (e.g., smart phone, IPad™, tablet computer, note pad, laptop, etc.); however, this is not required. The information to and from the smart device can be used to provide a variety of information to the processor unit to enable the processor unit to properly control the robotic golf caddy and/or provide information to the golfer. Such information can include, but is not limited to, the speed of the robotic golf caddy, topography of the golf course, barriers on the golf course (e.g., trees, bushes, lakes, rivers, sand traps, out of bounds lines, rocky regions, cliffs, steep slopes, gardens, steps, bridges, etc.), location of the robotic golf caddy on the golf course, etc. The information from the smart device can be used to prevent damage to the robotic golf caddy, prevent the robotic golf caddy from being stuck in a hazard on the golf course, navigate obstacles in the golf course, prevent the robotic golf caddy from moving into an unauthorized or undesired region on the golf course, etc. as the robotic golf caddy moves on the golf course. The information from the smart device can also or alternatively provide other information to the golfer, such as, but not limited to, a map of the golf course, a map of a particular hole, the distance to the green, the distance to the hole, recommended club based on position of the robotic golf caddy, recommended location to hit golf ball on course based on position of the robotic golf caddy, recommended strategies for a golf hole, topography of the golf course, topography of a particular golf hole, location of hazards on golf course, location of restrooms, location of cart paths, directions to next hole, location of club house, location of robotic golf caddy return, par information for a particular golf hole, information about the difficulty of golf course and/or golf hole, history of golf course and/or golf hole, date, time, USGA™ rules, score card, course sponsors, golf wager management, warning information about playing too slow on course, provide golfer information about current weather conditions at location, provide golfer warning or weather updates about current or future weather in area, shooting order based on distance from the green or hole, recommendation as to where to hit the ball on the golf course, wind speed, wind direction, contest information, scores of golfers, etc. The information from the smart device can also or alternatively provide other information to the golfer, such as, but not limited to, a detailed history of where each robotic golf caddy has been, the number and type of golf courses (e.g., number of 9 hole golf courses, number of 18 hole golf courses, etc.) the robotic golf caddy has completed, etc. The information from the smart device can also or alternatively provide information to the golfer, such as, but not limited to, member information, golfer information, member account information, distance the golfer walked, number of calories the golfer burned, fees on the golfer's account, maintenance required, diagnostic information, etc. The information from the smart device can be displayed on one or more of the displays on the robotic golf caddy; however, this is not required. As can be appreciated, information from the robotic golf caddy can be transmitted to the smart device to be displayed on the smart device; however, this is not required. The smart device can optionally be used to run a diagnostic of the robotic golf caddy, refresh and/or update information stored in the robotic golf caddy, download information from the robotic caddy into the smart device, and/or download software and/or information (e.g., map information, golf course information, golf information, etc.) from the smart device to the robotic golf caddy.

In another and/or alternative non-limiting aspect of the present invention, the robotic golf caddy can include one or more displays. The one or more displays can be touch screen displays; however, this is not required. In one non-limiting configuration, the robotic golf caddy includes an interactive display mounted to the robotic golf caddy and be in communication with the processor unit; however, this is not required. The display can be disconnected from the body of the robotic golf caddy; however, this is not required. The one or more displays can have a variety of functions including, but not limited to, displaying information to the user of the robotic golf caddy, providing instructional information to the user of the robotic golf caddy, providing diagnostics/status information (e.g., battery low, battery fully charged, sensors working, sensor malfunction, software error, software version, motor status, run time, etc.), providing connection status with smart device, providing connection status with a GPS system or other navigational system or map system, enabling the user to power up and power down the robotic golf caddy, displaying other information (e.g., a map of the golf course, a map of a particular hole, the distance to the green, the distance to the hole, recommended club based on position of the robotic golf caddy, recommended location to hit golf ball on course based on position of the robotic golf caddy, recommended strategies for a golf hole, topography of the golf course, topography of a particular golf hole, location of hazards on golf course, location of restrooms, location of cart paths, directions to next hole, location of club house, location of robotic golf caddy return, par information for a particular golf hole, information about the difficulty of golf course and/or golf hole, history of golf course and/or golf hole, date, time, USGA™ rules, score card, course sponsors, golf wager management, warning information about playing too slow on course, provide golfer information about current weather conditions at location, provide golfer warning or weather updates about current or future weather in area, shooting order based on distance from the green or hole, recommendation as to where to hit the ball on the golf course, wind speed, wind direction, contest information, scores of golfers, etc.). As can be appreciated, such information can also or alternatively be transmitted and/or displayed on a smart device when connected to the robotic golf caddy; however, this is not required. The display can also allow input of information (e.g., golf scores, player names, player handicap, time play started, time play ended, reservation of future tee times, ordering food or drink from club house, ordering food or drink to be delivered to golfer on golf course, communication with the club house or other areas on the golf course, ordering golf supplies at club house, requesting golf supplies to be delivered to golfer on golf course, etc.). As can be appreciated, information inputted to the display can be transmitted to a remote location (e.g., club house to keep track of scores, etc.) and/or to a smart device of golfer or some other person.

In another and/or alternative non-limiting aspect of the present invention, the robotic golf caddy can include an information storage system and/or memory unit capable of recording the operational time of the robotic golf caddy and/or the status of the robotic golf caddy. Additional information can include, but is not limited to, diagnostic information, maintenance required information, etc. Generally, all usage information of the robotic golf caddy (including any and all information and/or signals received, processed and/or sent by the processor unit) can be recorded and/or stored in the memory unit; however, this is not required. The memory unit can include a wireless (e.g., Bluetooth™, WiFi™, etc.) and/or wired connection (e.g., USB™ cable, Firewire™, HDMI cable, etc.) that can be used to connect a smart device (e.g., smart phone, iPad™, tablet computer, note pad, laptop, etc.), and/or be transmitted to a remote computer, server or to cloud storage such that the information recorded in the memory unit can be accessed by the golfer and/or some other user (e.g., golf course employee, manufacturer representative, owner or leaser of the robotic golf caddy, etc.).

In another and/or alternative non-limiting aspect of the present invention, the robotic golf caddy can optionally include a manual operation system capable of initiating a manual operation mode wherein the robotic golf caddy does not respond to signals from the remote transmitter, and which an automatic braking system of the robotic golf caddy is disengaged. In the manual operation mode (when used), the robotic golf caddy can be pushed or pulled by a golfer or alternatively towed by another vehicle (e.g., a golf cart, another robotic golf caddy, etc.).

In another and/or alternative non-limiting aspect of the present invention, the robotic golf caddy can optionally include an override system where power supplied to the wheels increases up to a predetermined level. When the predetermined level is reached or exceeded, the motor is stopped so as to prevent the motor from burning out over time during excessive power output. The override system (when used) is generally activated when the robotic golf caddy moves up a very steep slope, when there is too much weight on the robotic golf caddy, motor fault, and/or when one or more wheels lose traction on the golf course; however, it can be activated for some other reason.

In another and/or alternative non-limiting aspect of the present invention, the robotic golf caddy is designed to transport a full golf bag and all the usual golfing accessories (e.g., golf tees, towels, score cards, divot repair material, ball marker, grass repair mix, etc.) while following the golfer with the remote transmitter on the golf course. As can be appreciated, the robotic golf caddy can be designed to carry more than one golf bag; however, this is not required. In one non-limiting arrangement, the robotic golf caddy is designed to hold a full golf bag on top of the robotic golf caddy. In another and/or alternative non-limiting arrangement, the golf bag is held by the robotic golf caddy at an angle such that the base of the golf bag is positioned at or near the back wheels, and the top, open end of the golf bag is positioned at or near the front wheel; however, this is not required. In yet another and/or alternative non-limiting arrangement, the robotic golf caddy includes at least one strap designed to releasably secure the golf bag in position on the robotic golf caddy; however, this is not required. The robotic golf caddy can include a cavity that is configured to receive the bottom portion of one or more golf bags.

In another and/or alternative non-limiting aspect of the present invention, the robotic golf caddy is controlled by the one or more remote transmitters. When the remote transmitter moves away from the robotic golf caddy, the electronics system determines the direction and rate at which the remote transmitter is moving and will control the drive mechanism to the rear wheel set and their respective motor drives such that the robotic golf caddy will follow the remote transmitter at a rate and direction equivalent to the remote transmitter's movement. The control system, such as, for example, the processor unit, will ensure that a predetermined distance will be maintained between the robotic golf caddy and the remote transmitter. This mode of operation will optionally work in conjunction with the collision avoidance arrangement, and optionally with a GPS, smart device, and/or preprogrammed maps. As such, if a golfer having the remote transmitter walks through an area that is unsafe or not accessible or permitted for the robotic golf caddy, that robotic golf caddy can remain in position until the golfer moves into a certain range and walks in a permitted and/or safe path for the robotic golf caddy to follow, and/or the robotic golf caddy can determine and then move along a safe and/or permitted path to the golfer. The programming in the robotic golf caddy is designed to take into account the orientation of the robotic golf caddy relative to the golfer. For example, the robotic golf caddy is about 2-4 feet shorter than the average height of a golfer (e.g., 5'10"). As such, as the distance between the robotic golf caddy and the golfer varies, the angle of transition between the robotic golf caddy and the golfer constantly changes. The programming in the remote transmitter and/or robotic golf caddy is generally adapted to account for these distance changes so as to ensure that robotic golf caddy maintains a desired distance from the golfer. Generally, the remote transmitter is capable of operating at about 500-1500 MHz; however, other frequencies can be used. When multiple robotic golf caddies are used on the same golf course, each of the frequencies of the remote transmitter are generally different so that mutually exclusive channels for the remote transmitter can be used for a different robotic golf caddy. The remote transmitter can include at least one button and/or switch operable by the golfer which can allow the golfer to connect to the robotic golf caddy; however, this is not required. The remote transmitter can be rechargeable; however, this is not required.

In operation, the robotic golf caddy can follow a remote transmitter at a defined distance and can sense an impending collision with an object in its path, and can stop prior to said collision by steps including: (1) programming a predetermined map of the golf course in a memory of the robotic golf caddy, (2) programming a set of movement limitations and/or rules for the robotic golf caddy in the memory of the robotic golf caddy, (3) continuously determining a position of the remote transmitter relative to the robotic golf caddy as a golfer moves on the golf course, (4) continuously determining a position of the robotic golf caddy on the golf course via a plurality of sensors, (5) overlaying the determined positions of the robotic golf caddy on the programmed map of the golf course, (6) continuously determining a position of potential impending objects on the golf course near the robotic golf caddy via a plurality of sensors, (7) overlaying the determined position of the potential impending objects on the golf course on the programmed map of the golf course, and/or (8) moving the robotic golf caddy on the golf course in accordance with the programmed set of movement limitations and/or rules stored in the memory of the robotic golf caddy, the determined position of the remote transmitter relative to the robotic golf caddy, the determined position of the robotic golf caddy on the golf course, and/or the determined position of potential impending objects on the golf course.

In another and/or alternative non-limiting aspect of the present invention, the robotic golf caddy can be designed to replace and/or supplement a traditional golf caddy. Generally, the robotic golf caddy of the present invention can be rented out to golfers at a golf course such that multiple golfers can use separate robotic golf caddies; however, this is not required. As can be appreciated, more than one golfer can use the same robotic golf caddy. Before the robotic golf caddy is used, the robotic golf caddy is usually kept at or near a club house at a golf course where it can be charged, cleaned, refurbished, and/or otherwise maintained. In one non-limiting arrangement, each robotic golf caddy includes a remote transmitter connected thereto, such as, for example, by a clip, such that when the golfer desires to use the robotic golf caddy, the golfer need only remove the remote transmitter from the robotic golf caddy and place the remote transmitter on his or her belt. In such an arrangement, to prevent theft of the robotic golf caddy, each robotic golf caddy can be operatively controlled (e.g., "ON", "OFF", "STANDBY", etc.) by a golf course employee at the golf course, such as, for example, the club house attendant. In another and/or alternative non-limiting arrangement, when the robotic golf caddy is plugged into the charging station, the robotic golf caddy can be designed to be inoperable (i.e., non-responsive to the remote transmitter). As such, the robotic golf caddy must typically be unplugged from the charging station such that the robotic golf caddy can be permitted to leave the charging station; however, this is not required. Once the golf bag has been placed on the robotic golf caddy, a connection arrangement (e.g., strap, buckle, etc.) can be used to secure the golf bag in position on the robotic golf caddy; however, this is not required.

After the golfer has loaded a golf bag and/or golf accessories onto the robotic golf caddy, the golfer can optionally connect his or her smart device to the robotic golf caddy such that during golf play, statistics, diagnostics, and other types of information (as described above) can be presented to the golfer. The golfer can then move a switch on the remote transmitter to an "ON" position such that the robotic golf caddy connects to the remote transmitter and becomes responsive to the remote transmitter. As such, as the golfer begins to walk towards the first tee, the robotic golf caddy follows the remote transmitter (and therefore the golfer) at a predetermined distance.

As the golfer approaches the first tee, the golfer can then move the switch on the remote transmitter to an "OFF" position such that the robotic golf caddy stops and becomes unresponsive to the remote transmitter. As such, the golfer can move in the direction of the robotic golf caddy so as to select a golf club, pick up a golf accessory, view information presented on a smart device, etc., and enter the tee area without the robotic golf caddy following the golfer and/or causing a distraction to the golfer or other golfers on the golf course. In one non-limiting arrangement, the golf course can include a designated location at or near each tee on the golf course wherein when the robotic golf caddy enters the designated location (as optionally determined by the GPS system), the robotic golf caddy is caused to stop movement; however, this is not required. Alternatively, the remote transmitter can always be left on and the robotic golf caddy can be programmed to allow a golfer to approach the robotic golf caddy when the robotic golf caddy senses that the golfer is approaching the robotic golf caddy. In such an arrangement, the robotic golf caddy can be program such that when the golfer is within a certain distance of the robotic golf caddy, the robotic golf caddy will remain stationary; however, this is not required.

After hitting a golf ball off the first tee, the golfer can approach the robotic golf caddy so as to replace the golf club back in the golf bag, put back a golf accessory, view information presented on a smart device, etc. As such, the robotic golf caddy does not move away from the golfer as the golfer approaches the robotic golf caddy. After the golfer replaces the golf club back in the golf bag, puts back a golf accessory onto the robotic golf caddy, views information on the smart device, etc., the golfer can move the switch on the remote transmitter back to an "ON" position such that the robotic golf caddy becomes responsive to the remote transmitter or the robotic golf caddy automatically becomes responsive to the remote transmitter when the robotic golf caddy senses that the golfer is moving away from the robotic golf cart. As such, the robotic golf caddy will follow the golfer down the fairway as the golf walks away from the robotic golf caddy.

As the golfer walks down the fairway toward the golf ball, the plurality of sensors and programmed information supplied to the processor unit of the robotic golf caddy are used by the robotic golf caddy to cause the robotic golf caddy to follow the golfer down the fairway at a predetermined distance. Generally, one or more components of the robotic golf caddy are designed to continuously track the remote transmitter so as to continuously calculate and/or determine the shortest possible distance to follow the golfer; however, this is not required. In another and/or alternative non-limiting arrangement, the remote transmitter and/or robotic golf caddy can include an adjustment system capable of adjusting the distance with which the robotic golf caddy follows the golfer on the golf course. As such, if the golfer desires for the robotic golf caddy to follow at a closer and/or further distance, the distance can be easily and conveniently adjusted without the need to have an attendant at the club house do so; however, this is not required.

When the golfer slows his/her walking pace, such as, for example, when the golfer approaches the golf ball, the robotic golf caddy will also slow its pace so as to maintain a proper, predetermined distance behind the golfer. As such, when the golfer approaches the golf ball and stops at or near the golf ball, the robotic golf caddy is programmed to stop at a predetermined distance from the golfer, such as, for example, the distance with which the robotic golf caddy follows the golfer while moving; however, this is not required. Such predetermined distance for following and/or stopping is generally about 2-50 feet (and all values and ranges therebetween), and typically about 3-20 feet. As the golfer approaches the robotic golf caddy on the golf course, the display on the robotic golf caddy can provide information to the golfer. The information displayed to the golfer can include, but is not limited to, a map of the golf course, distance to the hole, location of hazards or obstacles on the golf course, topography of the golf course, features on the golf course, suggested club use, etc. As can be appreciated, other or alternative types of information can be presented to the golfer, such as, for example, golfing tips relative to the location of the robotic golf caddy and/or golfer on the golf course.

If the golfer hits the golf ball into a restricted zone in which the robotic golf caddy is not permitted to enter as per movement limitations and/or rules optionally programmed in the robotic golf caddy, such as, for example, a hazard area (e.g., sand trap, etc.), the robotic golf caddy can be designed to stop outside the restricted zone; however, this is not required. In one non-limiting arrangement, movement of the robotic golf caddy stops at or near the edge of the restricted zone even when the remote transmitter is still in an "ON" position; however, this is not required. As such, when the golfer (and therefore the remote transmitter) leaves the restricted area, the robotic golf caddy is programmed to move towards the golfer without entering the restricted zone. If the golfer enters the restricted area from a position next to the robotic golf caddy but leaves the restricted area at a position spaced apart from the robotic golf caddy such as, for example, on the opposite side of a sand trap, the robotic golf caddy can be programmed to determine when the golfer leaves the restricted area and calculate the shortest possible route to approach the golfer without entering the restricted area; however, this is not required. When the robotic golf caddy approaches a restricted or unpermitted area and/or stops before entering the restricted or unpermitted area, the robotic golf caddy can emit a warning or notice signal to the golfer, display a warning or notice on one or more of the displays, and/or transmit a warning or notice to the golfer (e.g., on a smart device, remote transmitter on the golfer, etc.); however, this is not required.

When the golfer hits the golf ball onto the green and the golfer walks towards the green, the plurality of sensors and programmed information supplied to the processor unit of the robotic golf caddy can command the robotic golf caddy to follow the golfer to the green at a predetermined distance. Generally, one or more components of the robotic golf caddy are designed to continuously track the remote transmitter so as to continuously calculate and/or determine the shortest possible distance to follow the golfer; however, this is not required.

Most golf courses do not permit golf carts on putting greens. As such, the putting green can be programmed as a restricted zone on select golf courses; however, this is not required. When it is determined by the robotic golf caddy that the robotic golf caddy has approached a cart limit for a particular green, the robotic golf caddy can be programmed to stop at such location; however, this is not required. As such, when the golfer moves around on the putting green such as, for example, examining the putting green for slopes, divots, etc., the robotic golf caddy does not continuously try to move as close as possible to the golfer on the putting green. Thus, the robotic golf caddy does not pose a distraction to the golfer, other golfers, or spectators as the golfer moves on the putting green. Similarly, as the golfer approaches the robotic golf caddy at or near the edge of the putting green so as to select a golf club or pick up a golf accessory, the robotic golf caddy can also provide useful information to the golfer relative to the current golf hole; however, this is not required. When it is determined by the robotic golf caddy that the golfer has left the putting green, the robotic golf caddy can be programmed to move towards the golfer without entering the putting green or restricted area about the putting green.

This sequence of events by the robotic golf caddy is repeated for each hole on the golf course played by the golfer.

The robotic golf caddy can have one or more of the following features:

- Ultra-wide band sensor system for steering and/or collision avoidance.
- RF-based sensor system for steering and/or collision avoidance.
- Ultrasonic sensor system for steering and/or collision avoidance.
- Lidar technology for steering and/or collision avoidance.
- Bluetooth™ and/or WiFi™ connectability with smart device.
- Bluetooth™ and/or WiFi™ for use in steering and/or tracking.
- GPS-based tracking device for tracking the robotic golf caddy.
- GPS system for location information and/or yardage to a hole.
- WiFi system for connecting to internet.
- Mobile phone system for connecting to cell towers.
- LORAN system for steering and/or collision avoidance.
- Programmable maps for information about the golf course, location information and/or yardage to a hole.
- A plurality (e.g., 2-8) of sensor antennas for use in the steering system and/or the collision avoidance arrangement.
- A plurality of ultrasound sensors for collision avoidance.
- One or more displays that may or may not be a touch screen display.
- A display that provides start-up and/or shut-down options for the robotic golf caddy.
- Remote transmitter includes a tilt switch to cause the robotic golf caddy to stop when a certain tilt angle is detected by the remote transmitter (e.g., golfer falls down resulting in a tilt angle of the remote transmitter to cause the robotic golf caddy to stop, etc.).
- Robotic golf caddy and/or remote transmitter include sensors to detect acceleration (e.g. accelerometers, etc.), angle detectors, orientation detectors, relative vertical position detectors, etc.

Robotic golf caddy has multiple fuses for electrical safety.

Frame design of the robotic golf caddy allows for vertical storage of the robotic golf caddy.

Remote transmitter used by golfer includes a safety brake feature.

Software and/or processor unit enables accelerated braking/slowing speed of robotic golf caddy.

The processor unit is programmable for one or more features of the robotic golf caddy (e.g., acceleration, braking speed, top speed, turning speed, collision sensor distance, start window, hill climbing, following distance, maximum acceptable slope, maximum acceptable tilt, course configuration, course obstacles, golfer handicap, golfer name, leasor name, leasee name, course map, Geo Fencing, etc.).

Improved water protection of motor, processor unit, and/or electrical system.

Lithium ion power source for transmitter and/or robotic golf caddy movement system and/or operational system.

Vibration protection for antennas of sensors and/or receivers.

Improved electronics to reduce temperature drift of antennas of sensors.

Improved ultrasonic sensors for collision avoidance.

Personal cooler or personal cooler holder on robotic golf caddy.

Smart device charger or charging port.

USB, Ethernet and/or HDMI outlet.

WiFi connection capabilities to access internet.

Speakers.

Radio tuner.

Charger for remote transmitter.

CD and/or DVD player.

Lights to facilitate in illumination of a certain locations of a golf course.

Media interface to play music from a smart device.

Camera to take video and/or picture of golf swing or other features or activities on a golf course.

One or more seating areas for a golfer to sit.

Smart Device interface with robotic golf caddy (e.g., golf apps [e.g., golf wager management, golf strategy, club recommendations, golf ball tracking/location, etc.], scoring, handicap information, golf course guide, GPS/Google map information, USGA rules, GPS yardage, weather, score card, etc.).

Quick charging of battery.

Solar powered charging.

Cup/container holder in casing of robotic golf caddy.

Golf accessory holders in casing of robotic golf caddy.

Structural protection for antennas of sensors.

Simple access to battery charger.

GPS and/or smart device mount on casing of robotic golf caddy.

Retaining strap for golf bag.

Front end connection for easy lifting and storage of robotic golf caddy.

Information storage system.

Manual operation system.

Automatic braking system.

Override system.

Lateral sensors.

Gradient sensors.

It is accordingly one non-limiting object of the present invention to provide a robotic golf caddy suitable for use on a golf course.

It is another and/or alternative non-limiting aspect of the present invention to provide an autonomous robotic golf caddy responsive to a signal from a remote transmitter.

It is yet another and/or alternative non-limiting object of the present invention to provide an autonomous robotic golf caddy which is capable of following a remote transmitter at a pre-determined distance.

It is still yet another and/or alternative non-limiting object of the present invention to provide an autonomous robotic golf caddy which is capable of sensing an impending collision with an object in its path and stops prior to said collision.

These and other objects and advantages will become apparent from the discussion of the distinction between the invention and the prior art and when determining the non-limiting embodiments of the invention as shown in the accompanying drawing figures.

BRIEF DESCRIPTION OF THE DRAWINGS

Reference may now be made to the drawings, which illustrate various embodiments that the invention may take in physical form and in certain parts and arrangements of parts wherein:

FIG. 7 is an illustrative method for using the robotic golf caddy of FIGS. 1-6; and, FIG. 8 is another illustrative method for using the robotic golf caddy of FIGS. 1-6.

DETAILED DESCRIPTION OF A NON-LIMITING EMBODIMENT

Figure 1:
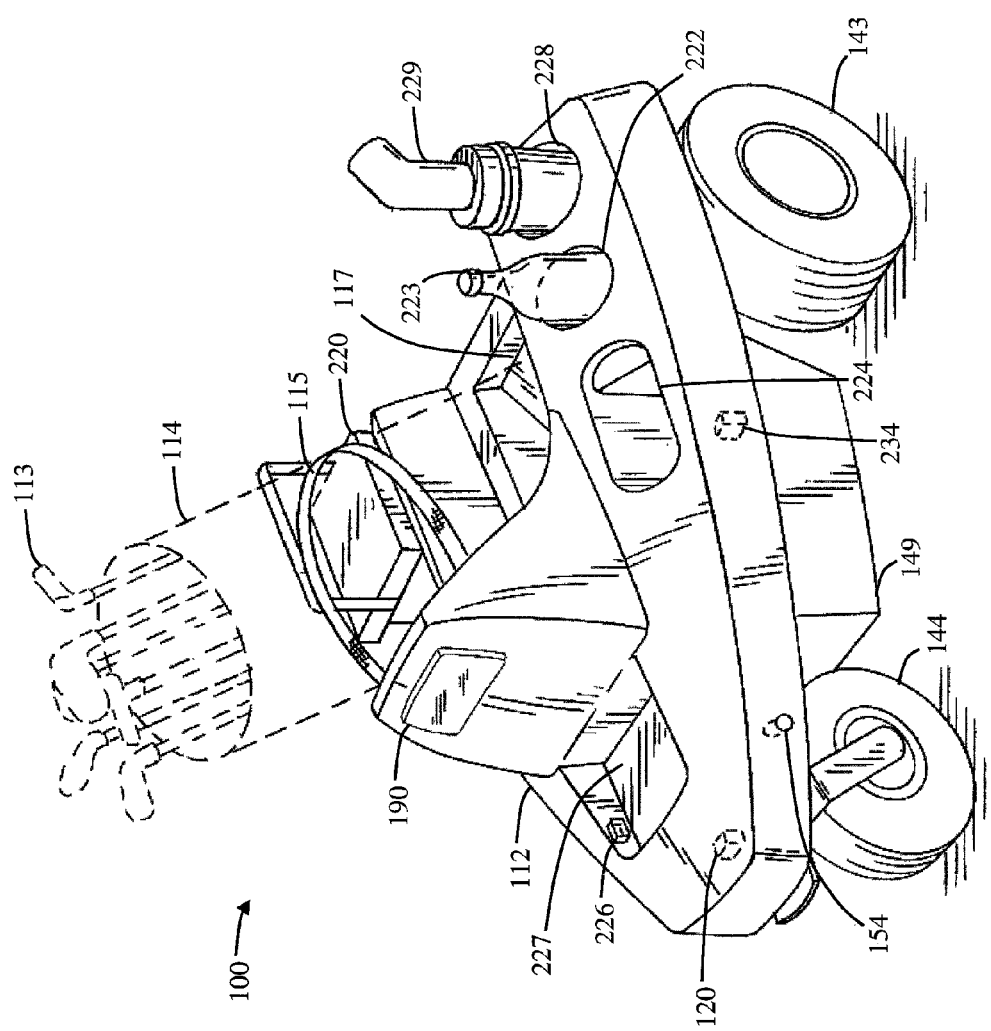
FIG. 1 is a perspective view of a robotic golf caddy in accordance with one non-limiting aspect of the present invention.

Referring now to the drawings wherein the showing is for the purpose of illustrating non-limiting embodiments of the invention only and not for the purpose of limiting the same, FIGS. 1-8 illustrate a non-limiting embodiment of a robotic golf caddy 100 in accordance with the present invention.

The robotic golf caddy 100 is configured to be responsive to a signal from a remote transmitter 200 carried by a golfer 102 as the golfer 102 moves on a golf course 104. The robotic golf caddy 100 is capable of following the remote transmitter 200 at a pre-determined distance. Additionally, the robotic golf caddy 100 is capable of sensing a potential impending collision with an object in its path of movement and is adapted to stop and/or re-route its path of movement prior to the collision. As such, the robotic golf caddy includes a golfer tracking arrangement (e.g., remote transmitter 200 and tracker receiver in the robotic golf caddy) and a collision avoidance arrangement. The golfer tracking arrangement is configured to ensure that the robotic golf caddy follows a golfer as the golfer walks and plays golf on the golf course. The golfer tracking arrangement can be configured to ensure that the robotic golf caddy maintains a predetermined distance between the robotic golf caddy and the golfer (e.g., 1-100 ft. and all values and ranges therebetween). Also, golfer tracking arrangement can be configured to ensure that the robotic golf caddy begins moving toward the golfer after a predetermined minimum distance between the robotic golf caddy and the golfer is detected to have been exceeded. For example, if the maximum distance preset for the robotic golf caddy is 60 ft. and the predetermined minimum distance is 5 ft., if the golfer moves more than 5 ft. from the robotic golf caddy, the processor unit in the robotic golf caddy will detect that the predetermined minimum distance between the robotic golf caddy and the golfer is exceeded and the processor unit will cause the robotic caddy to move toward to the golfer. Once the robotic golf caddy has moved at or within 5 ft. of the golfer, the processor unit in the robotic golf caddy will detect that the predetermined minimum distance between the robotic golf caddy and the golfer is not exceeded and the processor unit will cause the robotic golf caddy to stop movement. If the golfer moves more than 60 ft. from the robotic golf caddy, the processor unit in the robotic golf caddy will detect that the distance between the robotic golf caddy and the golfer has exceeded the predetermined maximum distance between the robotic golf caddy and the golfer and the processor unit will cause the robotic golf caddy to stop movement. When this event occurs, the golfer will need to walk toward the robotic golf caddy so that the distance is less than the 60 ft. The golfer may be required to reestablish communication between the remote transmitter 200 and the robotic golf caddy if the predetermined maximum distance between the robotic golf caddy and the golfer is exceeded and/or if communication is lost between the remote transmitter 200 and the robotic golf caddy. As can be appreciated, other predetermined maximum and minimum distances can be used. As also can be appreciated, the remote transmitter 200 and/or the robotic golf caddy can generate an audible and/or tactile alarm when the predetermined maximum distance between the robotic golf caddy and the golfer is exceeded and/or if communication is lost between the remote transmitter 200 and the robotic golf caddy; however, this is not required.

The robotic golf caddy can include one or more safety features. Such safety features include, but are not limited to, 1) the robotic golf caddy stops and/or turns off when a preset maximum distance between the remote transmitter and robotic golf caddy is exceed. Such distance is generally 5-25 ft. (and all values and ranges therebetween), and typically 8-15 ft., and more typically 9-12 ft. This preset maximum distance can be designed to be changeable by the golfer and/or authorized personnel; however, this is not required; 2) the robotic golf caddy can include a packing brake to inhibit or prevent unintentional movement of the robotic golf caddy; 3) the robotic golf caddy can include dynamic braking. Dynamic braking can not only be used to facilitate in the braking of the robotic golf caddy, but can also be used to recharge the battery on the robotic golf caddy; however, this is not required, 4) the robotic golf caddy stops or turns off if it passes the golfer that has the remote transmitter, 5) the robotic golf caddy stops or turns off if it gets too close to the golfer that has the remote transmitter (e.g., 0.6-4 ft. and all values and ranges therebetween). This minimum distance can optionally be changeable by the golfer and/or authorized personnel; 6) the robotic golf caddy stops or turns off if it exceeds a predefined maximum speed. This predefined maximum speed can optionally be changeable by the golfer and/or authorized personnel; 7) the robotic golf caddy stops or turns off if the battery power it below a predefined level; 8) the robotic golf caddy stops or turns off if one or more of sensors is malfunctioning; 9) the robotic golf caddy stops or turns off if the motor is overheating and/or malfunctioning; 10) the robotic golf caddy stops or turns off if one or more of the electronic components of the robotic golf caddy is malfunctioning, 11) the robotic golf caddy stops or turns off if a signal is lost with the remote transmitter; 12) the robotic golf caddy stops or turns off if there has been no detected movement of the remote transmitter for a predefined period of time; and/or 13) the robotic golf caddy includes circuit fuses for the motor and/or other electronic components of the robotic golf caddy.

The robotic golf caddy 100 is illustrated as including a housing 112 releasably mounted to a vehicle frame 110. The housing 112 is configured to at least partially enclose the workings of the robotic golf caddy 100 including the vehicle frame 110, a processor unit 130, at least a portion of a drive mechanism 140, a receiver 120, and/or a collision avoidance arrangement 150. Generally, the housing 112 is designed to releasably secure various golf items and/or golf accessories as would typically be carried by a golf caddy. As such, the top portion of housing 112 is configured to includes a golf bag cavity 117 that is designed to receive at least a bottom portion of a golf bag so that the golf bag 114 containing golf clubs 113 can be releasably secured to the housing. The cavity can also be designed to receive one or more golf accessories (e.g., umbrella, towel, etc.). Strap 115 is provided to secure the golf bag 114 in golf bag cavity 117. As can be appreciated, the golf bag cavity can be configured to hold more than one golf bag; however, this is not required. As illustrated in FIG. 1, the base of the golf bag cavity can be angled such that the golf bag tilts forwardly (5-30°) when secured in the golf bag cavity; however, this is not required.

The robotic golf caddy 100 is also illustrated as including other features including a personal cooler 220 and/or cavity for a personal cooler (e.g., cavity is configured to receive at least the base portion of a personal cooler, etc.), a cup holder 222 capable of holding a cup and/or bottle 223, an accessory holder 224 capable of holding a golf accessory such as, for example, a towel, golf balls, golf divot tool, ball marker, golf tees, golf gloves, etc. and/or personal items (e.g., keys, money, wallet, purse, glasses, glass case, watch, rings, jewelry, etc.) (not shown), a charging station/data connector 226 capable of charging one or more smart devices (e.g., smart phone, iPad™, tablet computer, note pad, laptop, golf range finder, etc.), and/or for transmitting data between a smart device and the robotic golf caddy, a supplemental accessory holder 228 capable of holding a divot/seed repair kit 229, and a front cavity 227 for holding an item (e.g., personal items, smart phone, golf accessories, etc.). As can be appreciated, the robotic golf caddy can include more than one personal cooler 220 and/or cavity for a personal cooler, cup holder, accessory holder, charging station/data connector, supplemental accessory holder, and/or front cavity. Although not shown, the robotic golf caddy 100 can be configured to releasably secure or temporarily hold other or alternative golf accessories or personal items as would typically be used by a golfer. Also, the robotic golf caddy can include one or more lights (not shown) to provide light to a certain region on a ground surface and/or to facilitate in locating the robotic golf caddy and/or to indicate proper operation and/or a malfunction of the robotic golf caddy; however, this is not required. As can be appreciated, the robotic golf caddy can have other or additional features (e.g., one or more USB, Ethernet and/or HDMI outlets, WiFi connection capabilities to access internet, one or more speakers, radio tuner, CD and/or DVD player, media interface to play music from a smart device, camera to take video and/or picture of golf swing or other features or activities on a golf course, one or more seating areas on the housing for a golfer, charger for remote transmitter etc.).

The robotic golf caddy 100 is illustrated as including a vehicle frame 110 and a receiver 120 mounted to the vehicle frame 110. The receiver 120 is adapted to receive a signal 121 from the remote transmitter 200. The received generally includes an antenna and is typically located at the front or front region of the robotic golf caddy. The receiver 120 is also illustrated as being in communication with a processor unit 130 such that when the receiver 120 receives a signal from the remote transmitter 200, the receiver 120 can send information to the processor unit 130 of robotic golf caddy 100. As such, the processor unit 130 can be programmed to process an input received in the form of a signal from the receiver 120 to determine a position of the remote transmitter 200 relative to the robotic golf caddy 100. Thus, the input received from the receiver 120 is adapted to cause the robotic golf caddy 100 to move relative to the remote transmitter 200 in accordance with programming of the processor unit 130.

Figure 2:
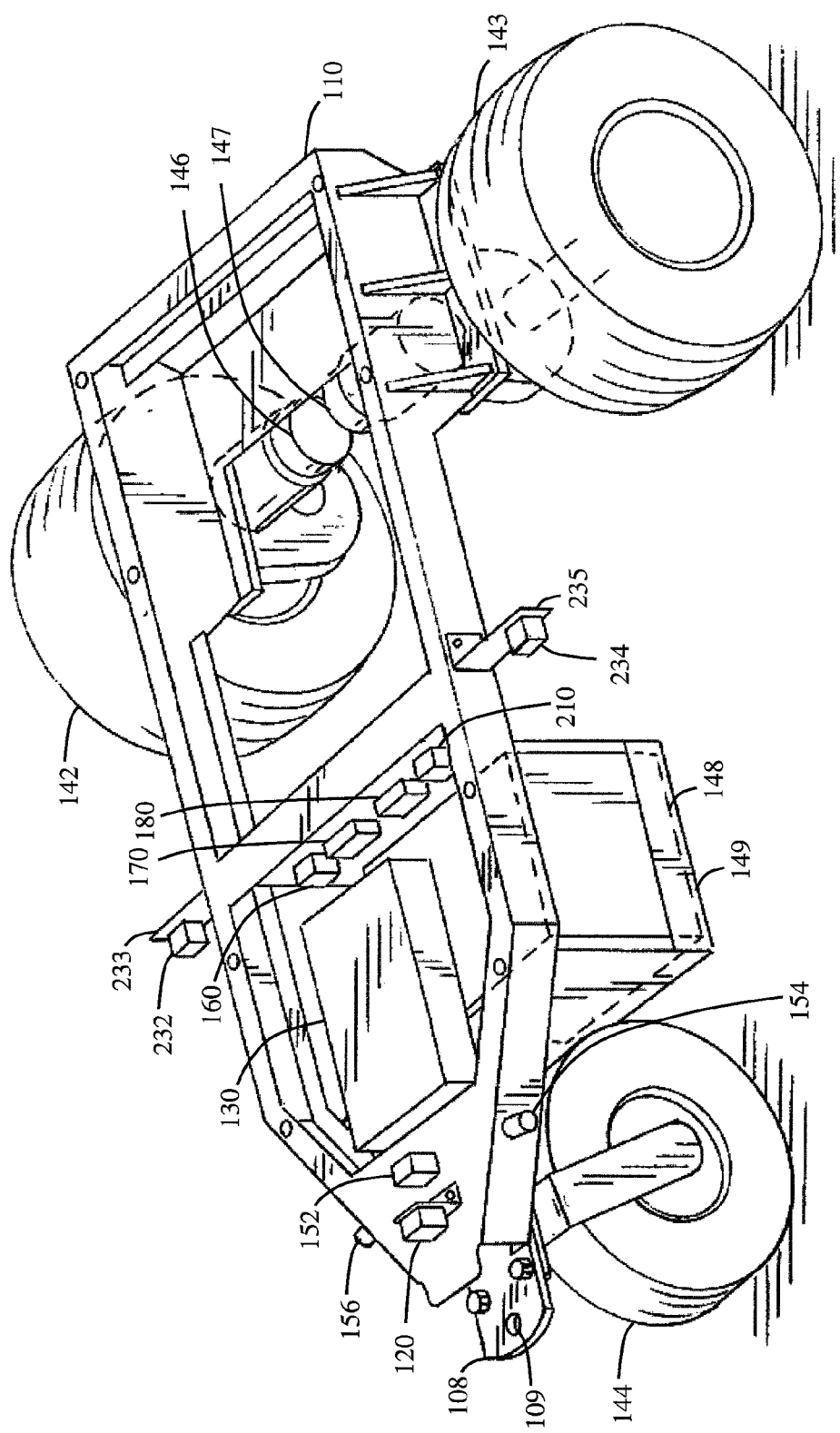
FIG. 2 is a perspective view of the robotic golf caddy of FIG. 1 with the housing removed.

The robotic golf caddy 100 is also illustrated as including a drive mechanism 140 mounted to the vehicle frame 110, and in communication with the processor unit 130. The drive mechanism 140 is configured to move the robotic golf caddy 100 in response to a signal received from the processor unit 130. The drive mechanism further includes a pair of drive wheels 142, 143 and one steering wheel 144. The drive wheels are generally wider and have a larger diameter than the steering wheel; however, this is not required. As best illustrated in FIG. 2, the drive mechanism further includes a pair of motors 146, 147 (e.g., electric motors) that are configured to drive the rotation of drive wheels 142, 143, respectively; however, one motor can be used to drive the rotation of the pair of drive wheels 142, 143. The drive mechanism is also illustrated as including a power source 148 that provides energy to the pair of motors 146, 147 to provide power to the drive mechanism 140. The power source 148 can be an electric power source (e.g., battery, etc.) or other or alternatively known power sources; however, this is not required. The power source 148 is illustrated as being held in a power source housing below the vehicle frame 110 of robotic golf caddy 100; however, this is not required.

The robotic golf caddy 100 is also illustrated as including a collision avoidance arrangement 150 in communication with the processor unit 130. The collision avoidance arrangement 150 comprises a plurality of sensors illustrated as sensors 152, 154, 156, 232, 234 that are spaced apart from one another about the robotic golf caddy 100. Sensors 152, 154, 156, 232, 234 are configured to detect potential impending objects around the robotic golf caddy 100. The sensors can be the same or different type of sensor. In one non-limiting arrangement, sensors 152, 154, 156 use narrowband technology such as ultrasound or LIDAR sensors, and sensors 232, 234 use wide band bandwidth such as ultra-wide band sensor. These two types of sensors work in conjunction with one another to obtain range information related to one or more objects within a field of coverage of the sensors; however, this is not required. The plurality of sensors on the robotic golf caddy 100 can form a zone of coverage (not shown) having a pre-determined radius (e.g., 0.1-200 ft. and all values and ranges therebetween) around the robotic golf caddy 100 such that 1) when a potential impending object is detected by the plurality of sensors, and/or 2) when the potential impending object is determined to be in the zone of coverage formed by the plurality of sensors, the collision avoidance arrangement is configured to send a signal to the processor unit 130, thereby causing the robotic golf caddy 100 to stop or avoid the detected potential impending object. As can be appreciated, more or fewer sensors can be used.

The plurality of sensors can also or alternatively be used as part of a preventative programming system programmed into the processor unit 130 of the robotic caddy 100 as software 138; however, this is not required. For example, if a boulder (not shown) is detected by the plurality of sensors, the processor unit 130 can instruct the robotic golf caddy 100 to avoid the water and find an alternate route and/or path around the boulder while still following the golfer 102 on the golf course 104. Similarly, if two trees (not shown) are detected by the sensors as being separated by a distance narrower than the width of the robotic golf caddy 100, the processor unit 130 can instruct the robotic golf caddy 100 to avoid the narrow gap between the trees and find an alternate route and/or path so as to continue following the golfer 102 on the golf course 104 at a predetermined distance.

As illustrated in FIG. 2, three narrowband technology sensors are located at the front region of the robotic golf caddy. It can be appreciated that the robotic golf caddy can include more than or less than three narrowband technology sensors. It can also be appreciated that the location of the narrowband technology sensors on the robotic golf caddy is non-limiting. For example, the robotic golf caddy could include at least four narrowband technology sensors that are located at each of the four corner regions of the robotic golf caddy to as to detect objects 360° about the robotic golf caddy; however, this is not required. As also illustrated in FIG. 2, two wide band bandwidth technology sensors are located on the sides of the robotic golf caddy. It can be appreciated that the robotic golf caddy can include more than or less than two wide band bandwidth technology sensors. It can also be appreciated that the location of the wide band bandwidth technology sensors on the robotic golf caddy is non-limiting. For example, the robotic golf caddy could include at least three wide band bandwidth technology sensors that are located at each side and at the front of the robotic golf caddy; however, this is not required.

The robotic golf caddy is also illustrated as including a navigation arrangement 230 in communication with the processor unit 130 to control movement of the robotic golf caddy 100. The navigation arrangement 230 can incorporate the Global Positioning System (GPS) system 160; however, other systems can be also or alternatively used (e.g., LORAN system, GSM system, etc.). The navigation arrangement 230 can be configured to be used in conjunction with the collision avoidance arrangement 150 to provide information to the processor unit 130 to control movement of the robotic golf caddy 100. The navigation arrangement 230 can include detailed golf course map information. For example, the navigation arrangement 230 can be used to determine yardage data of the robotic golf caddy from a particular location such as the distance between the robotic golf caddy and the golf hole, distance between the robotic golf caddy and the golf tee, distance between the robotic golf caddy and an object on the golf course, etc. Data from the navigation arrangement 230 can be merged and/or overlaid with a map 134 of the golf course stored in the memory 132 of the robotic golf caddy along with movement limitation 136 instructions. When a GPS system is used, the GPS system is configured to receive a signal 163 from a GPS satellite 162, and send information to the navigation arrangement and/or processor unit 130 of the robotic golf caddy 100 relating to the determined position of the robotic golf caddy 100 on the golf course. GPS information can be used in conjunction with the map information and the information from the collision avoidance arrangement 150 to provide information to the processor unit 130 to control movement of the robotic golf caddy 100. As such, the navigation arrangement thus enables Geo Fencing capabilities for the robotic golf caddy and also can be used to provide valuable information to the golfer on the golf course. The navigation arrangement can also be used to provide information about usage of the robotic golf caddy and location information of the robotic golf caddy.

Figure 3:
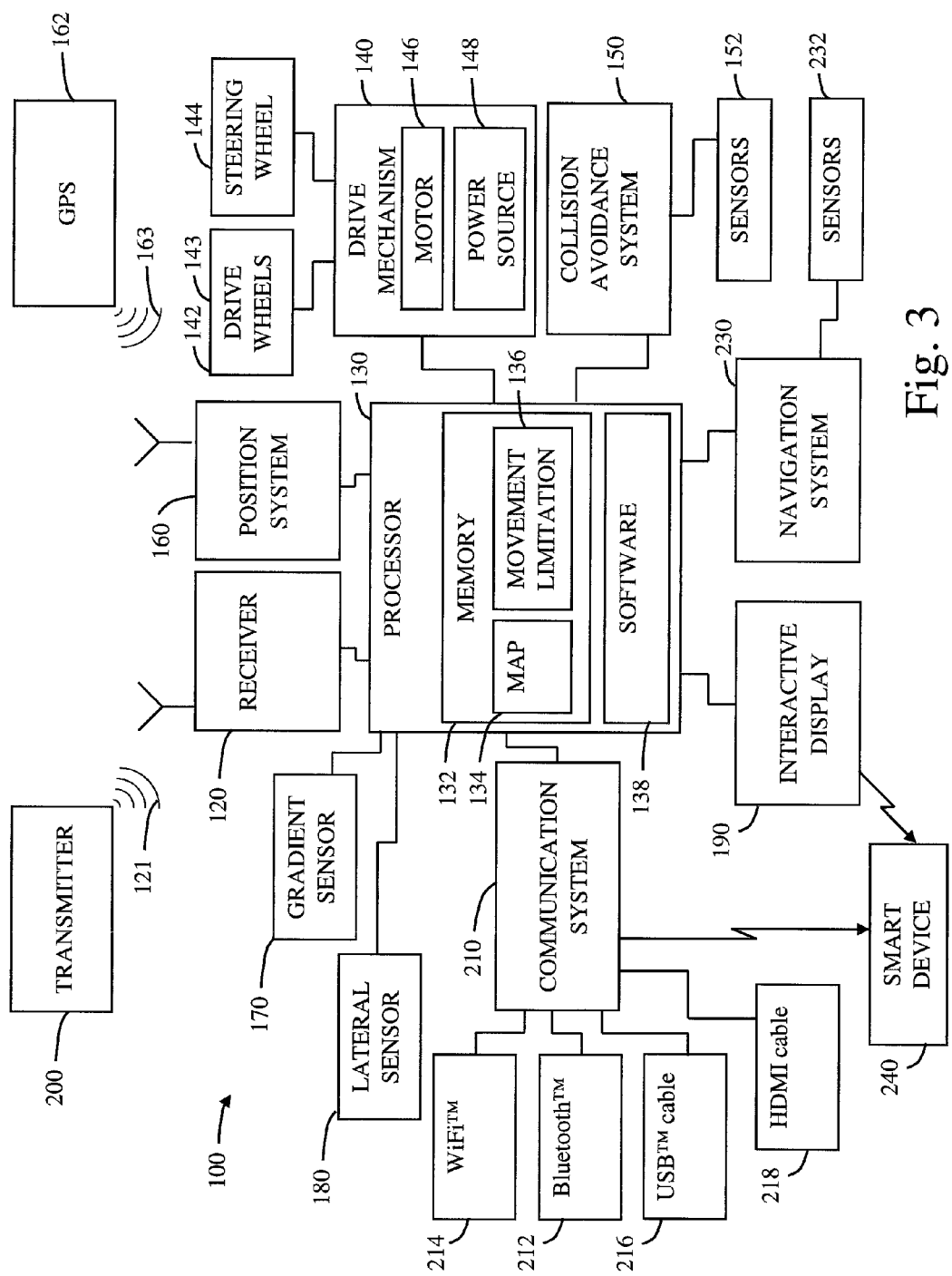
FIG. 3 is a non-limiting functional block diagram illustrating the workings and/or arrangements of the robotic golf caddy of FIGS. 1-2.

Referring now to FIGS. 2-3, the robotic golf caddy 100 is also illustrated as optionally including a gradient sensor 170 in communication with the processor unit 130 and mounted to the vehicle frame 110. The gradient sensor 170 is configured to provide information to the processor unit 130 related to a position of the robotic golf caddy 100 on an incline or gradient on the golf course. As such, the processor unit 130 can be configured to move the robotic golf caddy 100 in response to a signal received from the gradient sensor 170. The gradient sensor can be in the form of an accelerometer; however, this is not required.

With continued reference to FIGS. 2-3, the robotic golf caddy 100 is illustrated as also optionally including a lateral sensor 180 in communication with the processor unit 130 and mounted to the vehicle frame 110. The lateral sensor 180 is configured to provide information to the processor unit 130 related to a sideways tipping movement of the robotic golf caddy 100 as could, for example, occur when the robotic golf caddy 100 is on an incline or gradient of a golf course. The processor unit 130 can be configured to move the robotic golf caddy 100 in response to a signal received from the lateral sensor 180. The lateral sensor 180 and the gradient sensor 170 can optionally be combined into a single accelerometer; however, this is not required. As can be appreciated, an accelerometer can also or alternatively be located in the remote transmitter 200 and signals from the accelerometer in the remote transmitter can be sent to the processor unit of the robotic golf caddy to cause the robotic golf caddy to change speed and/or direction of movement based at least partially on such signals. As can also be appreciated, if the robotic golf caddy and remote transmitter both include an accelerometer, both of these signals can be used by the processor unit of the robotic golf caddy to cause the robotic golf caddy to change speed and/or direction of movement based at least partially on such signals.

The robotic golf caddy is 100 is also illustrated as including an interactive display 190 mounted to the robotic golf caddy 100. In particular, the interactive display 190 is mounted to the front face of an upwardly extending portion of the housing 112 and the back side of the upwardly extending portion supports an upper portion of the golf bag 114; however, it can be appreciated that the interactive display 190 can be mounted in other regions of the robotic golf caddy. As also can be appreciated, interactive display 190 can be releasably mounted to the robotic golf caddy; however, this is not required. The interactive display 190 is illustrated as being in communication with the processor unit 130, and is adapted to send signals thereto and receive signals therefrom. The interactive display 190 can be an LCD and/or LED display; however, other or alternative displays may be used. Similarly, the interactive display 190 can be a touchscreen display. The interactive display 190 is configured to interact with a user of the robotic golf caddy 100 by providing instructional information to the user of the robotic golf caddy 100, providing diagnostic and/or status information to the user of the robotic golf caddy 100, providing connection status with a smart device or system in communication with the robotic golf caddy 100, enabling a user to power-up or power-down the robotic golf caddy 100, or displaying other or alternative types of information to the user of the robotic golf caddy 100, etc. The interactive display 190 can optionally be in communication with the navigation arrangement and/or processor unit such that the interactive display 190 can provide information to the golfer that would typically be provided by the navigation arrangement and/or processor unit including information including, but not limited to, the golf hole number, distance to the center of the green, distance to the front of the green, distance to the back of the green, etc.; however, this is not required. The interactive display could optionally include a ball location function and when activate can use the sensors on the robotic golf caddy to held locate a golf ball of the golfer. The interactive display 190 can be releasably mounted to the front of the housing 112 of the robotic golf caddy 112; however, this is not required. As can be appreciated, a smart device located on the golfer or positioned on the robotic golf caddy can be connected by a wire or wirelessly to the navigation arrangement and/or processor unit so as to provide information to the navigation arrangement and/or processor unit (e.g., location information, weather information, golf course information, etc.). As can be appreciated, the smart device can function as a substitute for a GPC system in the golf caddy and/or be used as source of the map information for the golf course. As can also be appreciated, the smart device can be sued as a source of other or additional information.

As best illustrated in FIG. 2, the robotic golf caddy 100 is illustrated as including a connection arrangement comprising a plate 108 and a hole and/or aperture 109. The connection arrangement can be designed to facilitate attachment of the robotic golf caddy 100 to another robotic golf caddy and/or golf cart. The latch can be used to lift the robotic golf caddy into a storage position and/or to tow the robotic golf caddy.

The robotic golf caddy 100 is illustrated as including a communication system 210. The communication system 210 is illustrated as including a Bluetooth™ system 212 and a WiFi™ system 214 suitable for communication with the golfer. As can be appreciated, the communication system can include other wireless technologies and/or wired technologies, such as, for example, USB™ cable 216, Firewire™, HDMI cable 218, etc.

The Bluetooth™ system 212 can be configured to provide "outside-in" access to the robotic golf caddy 100. For example, the Bluetooth™ system 212 can provide external control of the robotic golf caddy 100 by a golf course employee and/or manufacturing representative so as to allow viewing of information (e.g., diagnostic information, etc.) stored by the robotic golf caddy 100. Additionally, the Bluetooth™ system 212 can be used by a golf course employee and/or manufacturing representative to access the robotic golf caddy 100 so as to adjust the navigation arrangement 230, run diagnostics on the robotic golf caddy 100, and/or download data and/or information stored on the robotic golf caddy 100. For example, robotic caddy usage data can be downloaded from the robotic golf caddy; however, other or alternative types of data can be accessed.

The WiFi™ system 214 can be configured to provide "inside-out" access to the robotic golf caddy 100. For example, the WiFi™ system 214 can be used by a golfer using the robotic golf caddy 100 to access and/or download data stored by the robotic golf caddy 100. Non-limiting examples (as described earlier) of data stored by the robotic golf caddy 100 and accessible by the golfer includes, but is not limited to, number of golf holes completed (e.g., 9 holes of golf completed, 18 holes of golf completed, etc.), golfer scores (e.g., transmission of golfer's scores into club handicap system, etc.), golfer member information, golf member account information (e.g., outstanding fees, etc.), distance the robotic golf caddy 100 traveled, distance the golfer walked, number of calories burned by the golfer, maintenance information, etc.

The communication system 210 and the interactive display 190 can be connected to a smart device 240. As such, a smart device 240 can be used to view selected types of information stored in the memory 132 of robotic golf caddy 100.

Figure 4:
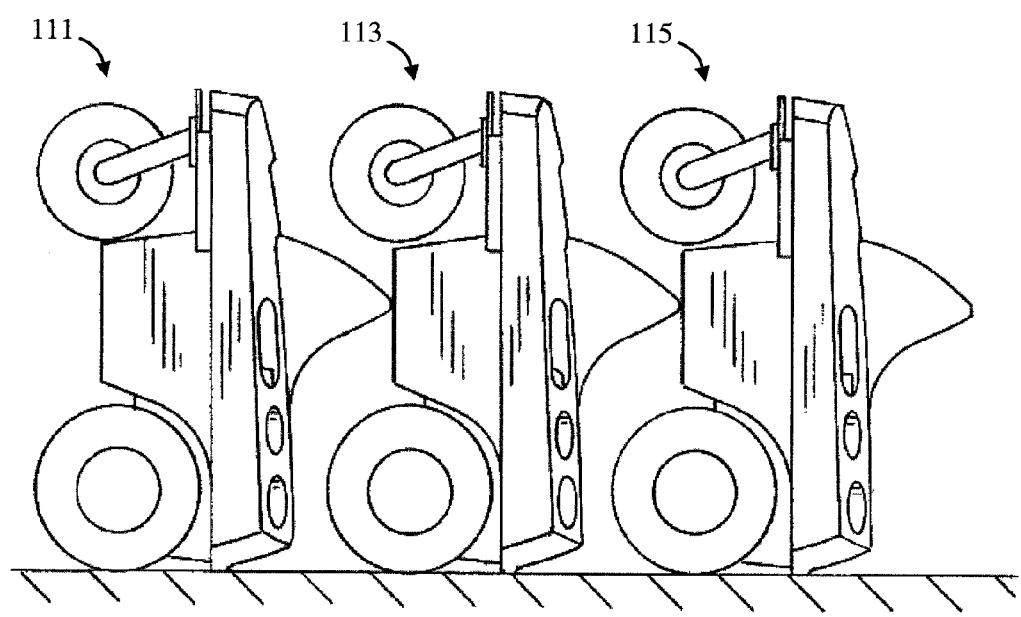
FIG. 4 is a perspective illustration of three robotic golf caddies being stored.
Figure 5:
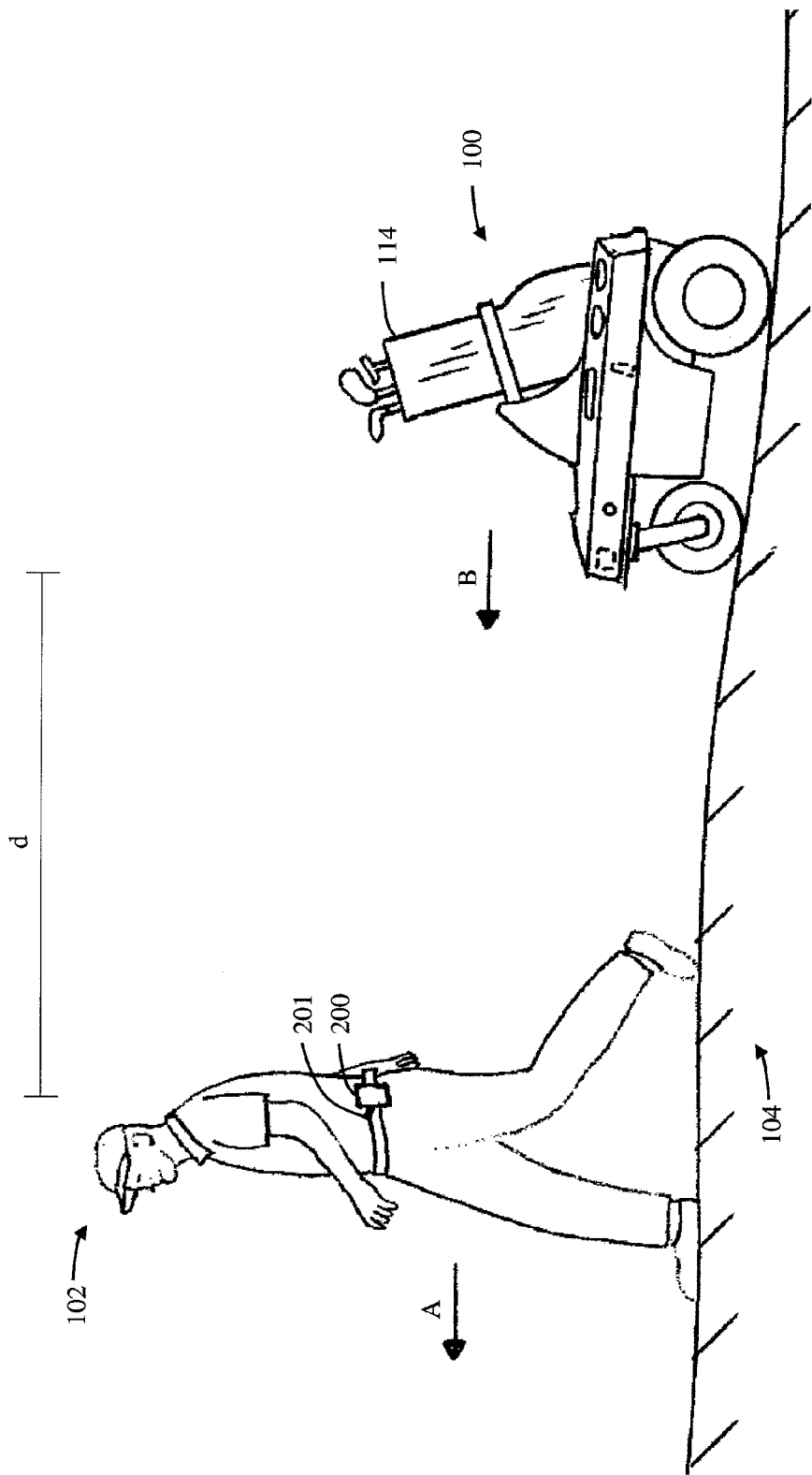
FIG. 5 is a perspective illustration of the robotic golf caddy of FIGS. 1-3 in use.

With reference now to FIG. 4, there is illustrated three robotic golf caddies 111, 113, 115 in accordance with the present invention in a storage position. In such a position, each robotic golf caddy 111, 113, 115 can be tilted rearwardly so as to sit on a back portion thereof. In the storage position, as illustrated in FIG. 4, the robotic golf caddy of the present invention provides the non-limiting advantage of saving space when stored, for example, in a club house on a golf course.

With reference now to FIGS. 5-8, there is provided an illustrative method for controlling movement of the robotic golf caddy 100 at a predetermined distance "d" behind a golfer 102 on a golf course 104. As described above, the golfer 102 can turn the robotic golf caddy 100 "ON" and "OFF" via switch 201 on remote transmitter 200; however, this is not required. Generally, as the golfer 102 moves in the direction indicated by arrow "A", the robotic golf caddy 100 is configured to move in the direction indicated by arrow "B" and follow the golfer 102 at a predetermined distance "d".

Figure 6:
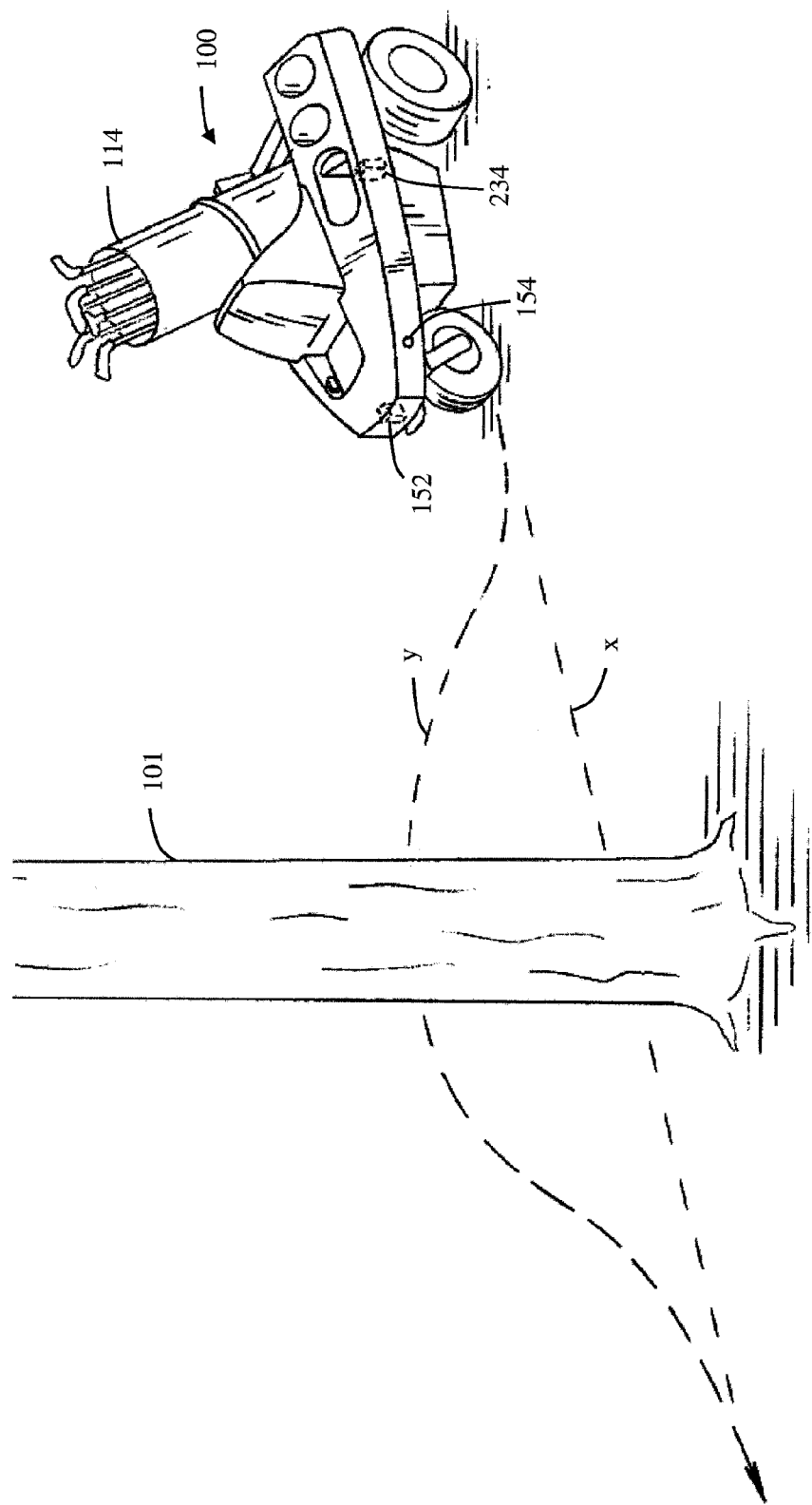
FIG. 6 is a perspective illustration of the collision avoidance arrangement of robotic golf caddy of FIGS. 1-3 in use.

As best illustrated in FIG. 6, the robotic caddy 100 is configured to sense a potential impending collision with an object, such as, for example, a tree 101, in its path of movement illustrated here as dotted line "x". The robotic caddy 100 can use any combination of sensors 152, 154, 156, 234, 232 for the purpose of detecting the impending collision and determining a new best path of movement. As such, the robotic golf caddy 100 is configured to avoid the potential impending collision with tree 101 by changing and/or adjusting to a new best path of movement, illustrated here as dotted line "y" around the tree 101 via inputs from any of sensors 152, 154, 156, 234, 232 to processor unit 130.

The illustrative method can include:

(1) providing 2 a robotic golf caddy 100 having at least one receiver 120 connected to a vehicle frame 110 thereof, a processor unit 130 in communication with at least one receiver 120, a drive mechanism 140 mounted to the vehicle frame 110, the drive mechanism operable by the processor unit 130, a navigation arrangement in communication with the processor unit 130, and a collision avoidance arrangement 150, (2) programming 4 the processor unit 130 of the robotic golf caddy 100 with a predetermined map 134 of the golf course 104, the programmed map 134 of the golf course 104 highlighting at least areas of importance on the golf course (e.g., trees, fairway, tee box, putting green, etc.).

(3) receiving 6 input signals from the positioning system 160 related to a position of a remote transmitter 200 held by the golfer relative to the robotic golf caddy 100, (4) receiving 8 input signals from the positioning system 160 related to a position of the robotic golf caddy 100 on the golf course relative to various objects on the golf course 104, (5) receiving 10 input signals from the collision avoidance arrangement 150 related to a position of potential impending objects in the path of the robotic golf caddy 100, (6) processing 12 the received input signals from the remote transmitter 200, the positioning system 160 and the collision avoidance arrangement 150 via the processor unit 130 of the robotic golf caddy 100, thereby generating an output signal providing a best path of movement for the robotic golf caddy 100 to approach and/or follow the golfer, and (7) moving 14 the robotic golf caddy 100 in response to the output signal of the processor unit 130 with in accordance with the movement limitations 136 stored in the memory 132 of the robotic golf caddy 100 so as to maintain a proper, predetermined following distance behind the golfer 102 on the golf course 104, and to avoid a potential collision with objects in the path of movement of the robotic golf caddy 100.

With reference now to FIG. 8, the processing 12 of the received input signals from the remote transmitter 200, the positioning system 160 and the collision avoidance arrangement 150 via the processor unit 130 can further comprise the steps of:

(6)(i) processing 16 the input signals received from the remote transmitter 200 so as to determine a position of the remote transmitter 200 relative to the robotic golf caddy 100, (6)(ii) processing 18 the input signals received from the positioning system 160 so as to determine a position of the robotic golf caddy 100 relative to various objects on the golf course 104, (6)(iii) processing 20 the input signals received from the collision avoidance arrangement 150 so as to determine the relative position of the potential impending object on the golf course 104, (6)(iv) merging 22 the determined position of the remote transmitter 200 relative to the robotic golf caddy 100 with the determined position of the robotic golf caddy 100 on the golf course and the determined position of the robotic golf caddy 100 relative to the potential impending object so as to determine a precise position of the robotic golf caddy 100 on the golf course 104 relative to objects on the golf course 104, and (6)(v) overlaying 24 the determined precise position of the robotic golf caddy 100 and the position of the objects on the golf course 104 on the programmed map 134 of the golf course 104.

The robotic golf caddy 100 is capable of continuously receiving input signals from the remote transmitter 200, the positioning system 160 and the collision avoidance arrangements 150, and continuously processes the continuously received input signals so as to continuously generate a new output signal providing new best paths of movement for the robotic golf caddy 100 as the robotic golf caddy 100 moves on the golf course 104; however, this is not required.

While considerable emphasis has been placed herein on the structures and configurations of the preferred embodiments of the invention, it will be appreciated that other embodiments, as well as modifications of the embodiments disclosed herein, can be made without departing from the principles of the invention. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

What is claimed:

1. An autonomous robotic golf caddy responsive to a signal from a remote transmitter, the autonomous robotic golf caddy including:
   a remote transmitter configured to be releasably connected to a golfer, said remote transmitter configured to transmit an ultra-wide band bandwidth signal having a bandwidth of greater than 500 MHz;
   a golf caddy having a vehicle frame and a housing connected to said vehicle frame, said housing having a golf bag cavity, a bag support, an electronic display, and a smart device charger, said golf bag cavity configured to receive a bottom portion of a golf bag when the golf bag is loaded on said housing, said bag support positioned forwardly of said golf bag cavity and extending upwardly from a top surface of said golf bag cavity, a rear surface of said bag support configured to support a portion of the golf bag when the golf bag is loaded on said housing and the bottom portion of the golf bag is positioned in said golf bag cavity, said electronic display secured to said bag support and configured to a) provide information to a golfer, b) provide information about said golf caddy, or a) and b), said smart device charger positioned forwardly of said golf bag cavity, said smart device charger configured to releasably connect to a smart device and charge a smart device;
   a tracking receiver system, said tracking receiver system configured to receive a signal from said remote transmitter, said tracking receiver system including a plurality of ultra-wide band bandwidth sensors;
   a processor unit in communication with said tracking receiver system, said processor unit configured to process a signal received from said tracking receiver system to determine a position of said remote transmitter relative to said golf caddy and to cause said golf caddy to move relative to the remote transmitter in accordance with instructions processed by said processor unit;
   a drive mechanism connected to said vehicle frame, said drive mechanism configured to move said golf caddy; and,
   a collision avoidance arrangement in communication with said processor unit, said collision avoidance arrangement including a plurality of ultrasonic sensors that are configured to detect objects about said golf caddy, said collision avoidance arrangement configured to send information to said processor unit to cause said golf caddy to avoid collision or contact with said detected objects.

2. The autonomous robotic golf caddy of claim 1, said bag support including a golf bag connection arrangement configured to releasably secure a golf bag to said housing.

3. The autonomous robotic golf caddy of claim 1, wherein at least two of said ultrasonic sensors are positioned on a front portion of said vehicle frame and positioned forwardly of said plurality of said ultra-wide band bandwidth sensors.

4. The autonomous robotic golf caddy of claim 3, wherein a spacing between said ultrasonic sensors that are adjacently positioned to one another is less than a spacing between said ultra-wide band bandwidth sensors that are adjacently positioned to one another.

5. The autonomous robotic golf caddy of claim 1, wherein the drive mechanism further includes at least one drive wheel, at least one steering wheel, an electric motor coupled to said at least one drive wheel; and, a power source electrically connected to said motor.

6. The autonomous robotic golf caddy of claim 1, further comprising a navigation arrangement in communication with said processor unit, said navigation arrangement is configured to obtain location information of said golf caddy, said location information is processed by said navigation arrangement, said processor unit, or combinations thereof facilitate in the movement of said golf caddy.

7. The autonomous robotic golf caddy of claim 1, wherein said navigation arrangement, said processor unit, or combinations thereof includes map information and said location information is used with said map information to facilitate in the movement of said golf caddy.

8. The autonomous robotic golf caddy of claim 6, wherein said navigation arrangement includes a global positioning system (GPS) system.

9. The autonomous robotic golf caddy of claim 1, further comprising a gradient sensor in communication with said processor unit, said gradient sensor providing information to said processor unit related to a position of said golf caddy on an incline of a gradient on a ground surface, said processor unit is configured to move said golf caddy in response to a signal received from said gradient sensor.

10. The autonomous robotic golf caddy of claim 1, further comprising a lateral sensor in communication with said processor unit, said lateral processor provide information to said processor unit related to a sideways tipping movement of said golf caddy, said processor unit is configured to move said golf caddy in response to a signal received from said lateral sensor.

11. The autonomous robotic golf caddy of claim 1, wherein said electronic display is an interactive display in communication with said processor unit, said interactive display is configured to interact with a user of said golf caddy.

12. The autonomous robotic golf caddy of claim 11, wherein said interactive display is configured to provide one or more types of information or functions to a user selected from the group consisting of (i) providing instructional information to the user regarding said golf caddy; (ii) providing golf-related information to the user; (iii) providing diagnostic/status information to the user regarding said golf caddy, said diagnostic/status information including one or more types of information selected from the group consisting of battery low, battery fully charged, sensors working, sensor malfunction, software error, software version, motor status, and run time of motor; (iv) providing a connection status with a smart device or system in communication with said processor unit of said golf caddy; (v) enabling a user to power up or power down said golf caddy; and (vi) enabling a user, owner, leasor or leasee to authorize, activate, deactivate, or combinations thereof said golf caddy.

13. The autonomous robotic golf caddy of claim 12, wherein said golf-related information to the user includes one or more types of information selected from the group consisting of (i) golf swing advice; (ii) a map of the golf course, (iii) map of a particular hole, (iv) distance to the green, (v) distance to the hole, (vi) recommended club based on position of said golf caddy, (vii) recommended location to hit golf ball on course base on position of said golf caddy, (viii) recommended strategies for the golf hole, (ix) topography of the golf course, (x) topography of a particular golf hole, (xi) location of hazards on golf course, (xii) location of hazards for a particular golf hole, (xiii) location of restrooms, (xiv) location of cart path, (xv) directions to next hole, (xvi) location of club house, (xvii) location of golf caddy return, (xviii) par information for a particular golf hole, (xix) information about the difficulty of golf course, (xx) information about the difficulty of golf hole, (xxi) history of golf course, (xxii) history of the golf hole, (xxiii) date, (xxiv) time, (xxv) USGA rules, (xxvi) score card, (xxvii) weather information, (xxviii) golf course congestion information, (xxix) golfer's handicap information, (xxx) further tee time availability, (xxxi) information about other golfers on golf course, (xxxii) course sponsors, (xxxiii) golf wager management, (xxxiv) warning information about playing too slow on course, (xxxv) wind speed, (xxxvi) wind direction, (xxxvii) contest information, (xxxviii) scores of golfers, (xxxvix) scores of golfers adjusted with handicap, (xxxx) history of golfer's score on golf course, (xxxxi) history of golfer's score on golf hole, (xxxxii) member information, (xxxiii) guest information, (xxxxiv) golfer information, (xxxxv) member account information, (xxxxvi) distance the golfer walked, (xxxxvii) number of calories the golfer burned, (xxxxviii) fees on the golfer's account, (xxxxix) golf event information, (xxxxx) future golf event info or reminder, (xxxxxi) tee time, (xxxxxii) tee time reminder, and (xxxxxiii) weather advisory or warnings.

14. The autonomous robotic golf caddy of claim 1, wherein said collision avoidance arrangement includes at least three ultrasonic sensors.

15. A method for controlling movement of an autonomous robotic golf caddy at a predetermined distance behind a golfer on a golf course, the method comprising:
providing a remote transmitter that is configured to be releasably connected to the golfer, said remote transmitter configured to transmit an ultra-wide band bandwidth signal having a bandwidth of greater than 500 MHz;
providing said autonomous golf caddy, said autonomous golf caddy including:
a vehicle frame and a housing connected to said vehicle frame, said housing having a golf bag cavity, a bag support, an electronic display, and a smart device charger, said golf bag cavity configured to receive a bottom portion of a golf bag when the golf bag is loaded on said housing, said bag support positioned forwardly of said golf bag cavity and extending upwardly from a top surface of said golf bag cavity, a rear surface of said bag support configured to support a portion of the golf bag when the golf bag is loaded on said housing and the bottom portion of the golf bag is positioned in said golf bag cavity, said electronic display secured to said bag support and configured to a) provide information to a golfer, b) provide information about said golf caddy, or a) and b), said smart device charger positioned forwardly of said golf bag cavity, said smart device charger configured to releasably connect to a smart device and charge a smart device;
a tracking receiver system, said tracking receiver system configured to receive a signal from a remote transmitter that is adapted to be located on a golfer, said tracking receiver system including a plurality of ultra-wide band bandwidth sensors;
a processor unit in communication with said tracking receiver system, said processor unit configured to process a signal received from said tracking receiver system to determine a position of said remote transmitter relative to said golf caddy and to cause said golf caddy to move relative to the remote transmitter in accordance with instructions processed by said processor unit;
a drive mechanism connected to said vehicle frame, said drive mechanism configured to move said golf caddy; and,
a collision avoidance arrangement in communication with said processor unit, said collision avoidance arrangement including a plurality of ultrasonic sensors that are configured to detect objects about said golf caddy, said collision avoidance arrangement configured to send information to said processor unit to cause said golf caddy to avoid collision or contact with said detected objects;
creating a communication connection between said remote transmitter and said golf caddy;
wherein said golf caddy is configured to follow the golfer on a golf course and to avoid collision with objects on the golf course by use of said collision avoidance arrangement.

16. The method of claim 15, further including the steps of:
programming said processor unit, a navigation arrangement, or combinations with map information of said golf course;
obtaining location information of said golf caddy on said golf course; and,
comparing said location information to said map information to facilitate in movement of said golf caddy on said golf course.

17. The method of claim 15, further including the steps of:
said golf caddy receiving a signal from said remote transmitter;
determining a relative position of said remote transmitter to said golf caddy; and,
causing said golf caddy to move toward said golfer when a distance of said golfer from said golf caddy is greater than a predefined distance.

18. The method of claim 15, further including the steps of:
said processor unit receiving signals from said collision avoidance arrangement;
said processor unit processes said signals receive from said collision avoidance arrangement to determine if an object is detected about said golf caddy; and,
said processor unit causing said golf caddy to navigate about a detected object to avoid contact or collision with said detected object.

19. The method of claim 16, further including the steps of:
designating authorized and unauthorized locations on said golf course; and,
using said map information and said location information to cause said golf caddy to navigate away from said unauthorized locations and to maintain a location within said authorized locations.

20. The method of claim 16, further including the step of using said map information, said location information, and information from said collision avoidance arrangement to cause said golf caddy to follow a safe and effective path of movement to said golfer.

21. The method of claim 17, further including the step of causing said golf caddy to maintain a predetermined following distance behind said golfer on the golf course and to avoid a potential collision with objects in a path of movement of said golf caddy based at least partially on information from said collision avoidance arrangement and information received from said remote transmitter.

22. The method of claim 15, wherein said processing unit processes a plurality of signals selected from the group consisting of (i) input signals received from said remote transmitter that are used to determine a position of said remote transmitter relative to said golf caddy; (ii) input signals received from said navigation arrangement that are used to determine a geographic location of said golf caddy on said golf course; (iii) input signals received from said collision avoidance arrangement that are used to locate objects about said golf caddy; (iv) input signals received from a smart device located on the golfer, located on the golf caddy or combinations thereof; (v) input signals received from a smart device other than the golfer; and (vi) input signals received wirelessly from a remote location that is outside a golf playing area; said processing unit configured to process said plurality of said signals to cause said golf caddy to follow said golfer at a predefined distance or distance range and to avoid collision or contact with a detected object on said golf course.

23. An autonomous robotic golf caddy responsive to a signal from a remote transmitter, said autonomous robotic golf caddy including:
  a remote transmitter configured to be releasably connected to a golfer, said remote transmitter configured to transmit an ultra-wide band bandwidth signal;
  a golf caddy having a vehicle frame and a housing connected to said vehicle frame, said housing having a golf bag cavity, a bag support, and an electronic display, said golf bag cavity configured to receive a bottom portion of a golf bag when the golf bag is loaded on said housing, said bag support positioned forwardly of said golf bag cavity and extending upwardly from a top surface of said golf bag cavity, a rear surface of said bag support configured to support a portion of the golf bag when the golf bag is loaded on said housing and the bottom portion of the golf bag is positioned in said golf bag cavity, said bag support including a golf bag connection arrangement configured to releasably secure the golf bag to said housing when the bottom portion of the golf bag is positioned in said golf bag cavity, said electronic display configured to a) provide information to a golfer, b) provide information about said golf caddy, or a) and b);
  a tracking receiver system, said tracking receiver system configured to receive a signal from said remote transmitter, said tracking receiver system including first and second ultra-wide band bandwidth sensors;
  a collision avoidance arrangement in communication with said processor unit, said collision avoidance arrangement including first and second ultrasonic sensors that are configured to detect objects about said golf caddy, said first and second ultrasonic sensors are positioned on a front portion of said vehicle frame and positioned forwardly of said first and second ultra-wide band bandwidth sensors, a spacing between said first and second ultrasonic sensors is less than a spacing between said first and second ultra-wide band bandwidth sensors;
  a processor unit in communication with said tracking receiver system, said processor unit configured to process a signal received from said tracking receiver system to determine a position of said remote transmitter relative to said golf caddy and to cause said golf caddy to move relative to said remote transmitter in accordance with instructions processed by said processor unit, said collision avoidance arrangement configured to send information to said processor unit to cause said golf caddy to avoid collision or contact with said detected objects; and,
  a drive mechanism connected to said vehicle frame, said drive mechanism configured to move said golf caddy.

24. The autonomous robotic golf caddy as defined in claim 23, wherein said first ultra-wide band bandwidth sensor is positioned on one side of said vehicle frame and said second ultra-wide band bandwidth sensor is positioned on an opposite side of said vehicle frame, said first and second ultra-wide band bandwidth sensors spaced equal distances from a front end and a rear end of said vehicle frame.

25. The autonomous robotic golf caddy as defined in claim 23, wherein said electronic display is secured to said bag support.

26. The autonomous robotic golf caddy as defined in claim 24, wherein said electronic display is secured to said bag support.

27. The autonomous robotic golf caddy as defined in claim 23, wherein a first accelerometer is included in said remote transmitter and a second accelerometer is included on said vehicle frame, said processor unit configured to receive information from said first and second accelerometers and to use such received information to control a speed of said golf caddy, a direction of movement of said golf caddy, or combinations thereof.

28. The autonomous robotic golf caddy as defined in claim 26, wherein a first accelerometer is included in said remote transmitter and a second accelerometer is included on said vehicle frame, said processor unit configured to receive information from said first and second accelerometers and to use such received information to control a speed of said golf caddy, a direction of movement of said golf caddy, or combinations thereof.

29. The autonomous robotic golf caddy as defined in claim 23, further comprising a navigation arrangement in communication with said processor unit, said navigation arrangement is configured to obtain location information of said golf caddy; said location information is processed by said navigation arrangement, said processor unit, or combinations thereof to facilitate in the movement of said golf caddy; said navigation arrangement, said processor unit, or combinations thereof includes map information and said location information is used with said map information to facilitate in a direction of movement of said golf caddy, said navigation arrangement includes a global positioning system (GPS) system.

30. The autonomous robotic golf caddy as defined in claim 23, further comprising a gradient sensor in communication with said processor unit, said gradient sensor providing information to said processor unit related to a position of said golf caddy on an incline of a gradient on a ground surface, said processor unit is configured to move said golf caddy in response to a signal received from said gradient sensor.

31. The autonomous robotic golf caddy as defined in claim 23, further comprising a lateral sensor in communication with said processor unit, said lateral processor provide information to said processor unit related to a sideways tipping movement of said golf caddy, said processor unit is configured to move said golf caddy in response to a signal received from said lateral sensor.

32. The autonomous robotic golf caddy as defined in claim 23, wherein said electronic display is an interactive display in communication with said processor unit, said interactive display is configured to interact with a user of said golf caddy, said interactive display is configured to provide one or more types of information or functions to a user selected from the group consisting of (i) providing instructional information to the user regarding said golf caddy; (ii) providing golf-related information to the user;

(iii) providing diagnostic/status information to the user regarding said golf caddy, said diagnostic/status information including one or more types of information selected from the group consisting of battery low, battery fully charged, sensors working, sensor malfunction, software error, software version, motor status, and run time of motor; (iv) providing a connection status with a smart device or system in communication with said processor unit of said golf caddy; (v) enabling a user to power up or power down said golf caddy; and (vi) enabling a user, owner, leasor or leasee to authorize, activate, deactivate, or combinations thereof said golf caddy; said golf-related information to the user includes one or more types of information selected from the group consisting of (i) golf swing advice; (ii) a map of the golf course, (iii) map of a particular hole, (iv) distance to the green, (v) distance to the hole, (vi) recommended club based on position of said golf caddy, (vii) recommended location to hit golf ball on course base on position of said golf caddy, (viii) recommended strategies for the golf hole, (ix) topography of the golf course, (x) topography of a particular golf hole, (xi) location of hazards on golf course, (xii) location of hazards for a particular golf hole, (xiii) location of restrooms, (xiv) location of cart path, (xv) directions to next hole, (xvi) location of club house, (xvii) location of golf caddy return, (xviii) par information for a particular golf hole, (xix) information about the difficulty of golf course, (xx) information about the difficulty of golf hole, (xxi) history of golf course, (xxii) history of the golf hole, (xxiii) date, (xxiv) time, (xxv) USGA rules, (xxvi) score card, (xxvii) weather information, (xxviii) golf course congestion information, (xxix) golfer's handicap information, (xxx) further tee time availability, (xxxi) information about other golfers on golf course, (xxxii) course sponsors, (xxxiii) golf wager management, (xxxiv) warning information about playing too slow on course, (xxxv) wind speed, (xxxvi) wind direction, (xxxvii) contest information, (xxxviii) scores of golfers, (xxxvix) scores of golfers adjusted with handicap, (xxxx) history of golfer's score on golf course, (xxxxi) history of golfer's score on golf hole, (xxxxii) member information, (xxxiii) guest information, (xxxxiv) golfer information, (xxxxv) member account information, (xxxxvi) distance the golfer walked, (xxxxvii) number of calories the golfer burned, (xxxxviii) fees on the golfer's account, (xxxxix) golf event information, (xxxxx) future golf event info or reminder, (xxxxxi) tee time, (xxxxxii) tee time reminder, and (xxxxxiii) weather advisory or warnings.

* * * * *